United States Patent
Jeon et al.

(10) Patent No.: US 11,471,806 B2
(45) Date of Patent: Oct. 18, 2022

(54) AIR PURIFIER AND PURIFYING SYSTEM

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jongkeon Jeon, Seoul (KR); Haeyoong Chung, Seoul (KR); Jiyoung Kang, Seoul (KR); David Kangseong Lee, Seoul (KR); Daeyoung Kwak, Seoul (KR); Sohee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 16/818,180

(22) Filed: Mar. 13, 2020

(65) Prior Publication Data
US 2020/0298160 A1 Sep. 24, 2020

(30) Foreign Application Priority Data

Mar. 19, 2019 (KR) .................. 10-2019-0031477
Jul. 29, 2019 (KR) .................. 10-2019-0091546

(51) Int. Cl.
*B01D 46/00* (2022.01)
*B01D 46/44* (2006.01)
*B01D 46/58* (2022.01)

(52) U.S. Cl.
CPC ..... *B01D 46/0005* (2013.01); *B01D 46/0043* (2013.01); *B01D 46/442* (2013.01);
(Continued)

(58) Field of Classification Search
CPC .................. B01D 46/24; B01D 46/2403; B01D 46/0005; B01D 46/0043; B01D 46/62;
(Continued)

(56) References Cited

U.S. PATENT DOCUMENTS

| 7,419,533 B2 | 9/2008 | Son et al. | |
| 10,302,321 B2 * | 5/2019 | Sakai | ............ F24F 7/007 |

(Continued)

FOREIGN PATENT DOCUMENTS

| CN | 1510348 | 7/2004 |
| CN | 1651827 | 8/2005 |

(Continued)

OTHER PUBLICATIONS

European Search Report dated Aug. 25, 2020 issued in Application No. 20161011.0.
(Continued)

*Primary Examiner* — Robert Clemente
(74) *Attorney, Agent, or Firm* — KED & Associates LLP

(57) ABSTRACT

An air purifying system may include at least two air purifiers configured to operate independently and a docking station to support the at least two air purifiers. The docking station may include a backbone extending in a vertical direction and at least two supports corresponding to and supporting the at least two air purifiers. At least one air purifier may have a display configured to operate according to a plurality of modes. When the air purifier having the display is docked on the docking station, the display may indicate overall operating information of the entire air purifying system. When the air purifier having the display is separated from the docking station, the display may indicate individual operating information of the air purifier having the display.

20 Claims, 14 Drawing Sheets

(52) U.S. Cl.
CPC .......... *B01D 46/58* (2022.01); *B01D 2267/60* (2013.01); *B01D 2279/50* (2013.01)

(58) Field of Classification Search
CPC .................... B01D 46/64; B01D 46/0002; B01D 46/0004; B01D 46/0049; B01D 46/58; B01D 46/60; B01D 46/442; B01D 2267/60; B01D 2279/50; F24F 8/10; F24F 8/108; F24F 1/0071; F24F 1/0073
See application file for complete search history.

(56) References Cited

U.S. PATENT DOCUMENTS

| | | |
|---|---|---|
| 2004/0118288 A1 | 6/2004 | Kim et al. |
| 2005/0172816 A1 | 8/2005 | Son et al. |
| 2005/0268583 A1 | 12/2005 | Han et al. |
| 2006/0107834 A1 | 5/2006 | Vandenbelt |
| 2006/0162300 A1 | 7/2006 | Sharifi |
| 2006/0277875 A1 | 12/2006 | Schuld |

FOREIGN PATENT DOCUMENTS

| | | |
|---|---|---|
| CN | 1752617 | 3/2006 |
| CN | 104822999 | 8/2015 |
| CN | 105091105 | 11/2015 |
| CN | 105823135 | 8/2016 |
| CN | 106813315 | 6/2017 |
| CN | 107023885 | 8/2017 |
| CN | 108662711 | 10/2018 |
| EP | 1 433 516 | 6/2004 |
| KR | 10-2006-0026319 | 3/2006 |
| KR | 10-2016-0077888 | 7/2016 |
| WO | WO 2004/014521 | 2/2004 |
| WO | WO 2019/026761 | 2/2017 |
| WO | WO 2017/142026 | 8/2017 |

OTHER PUBLICATIONS

Chinese Office Action dated Jun. 24, 2021 issued in Application No. 202010181669.0.
Chinese Office Action issued in Application No. 202010115748.1 dated May 11, 2021.
European Search Report dated Aug. 12, 2020 issued in Application No. 20163888.9.
Chinese Office Action dated Jun. 11, 2021 issued in CN Application No. 202010118631.9.
Chinese Office Action dated Dec. 9, 2021 issued in Application No. 202010118631.9.
Chinese Office Action issued in Application No. 2021102903629710 dated Nov. 3, 2021.
European Search Report dated Aug. 10, 2020 issued in Application No. 20160848.6.
U.S. Appl. No. 16/818,096, filed Mar. 13, 2020.
U.S. Appl. No. 16/818,180, filed Mar. 13, 2020.
U.S. Appl. No. 16/819,368, filed Mar. 16, 2020.
European Office Action dated Apr. 14, 2022 issued in EP Application No. 20163888.9.

\* cited by examiner

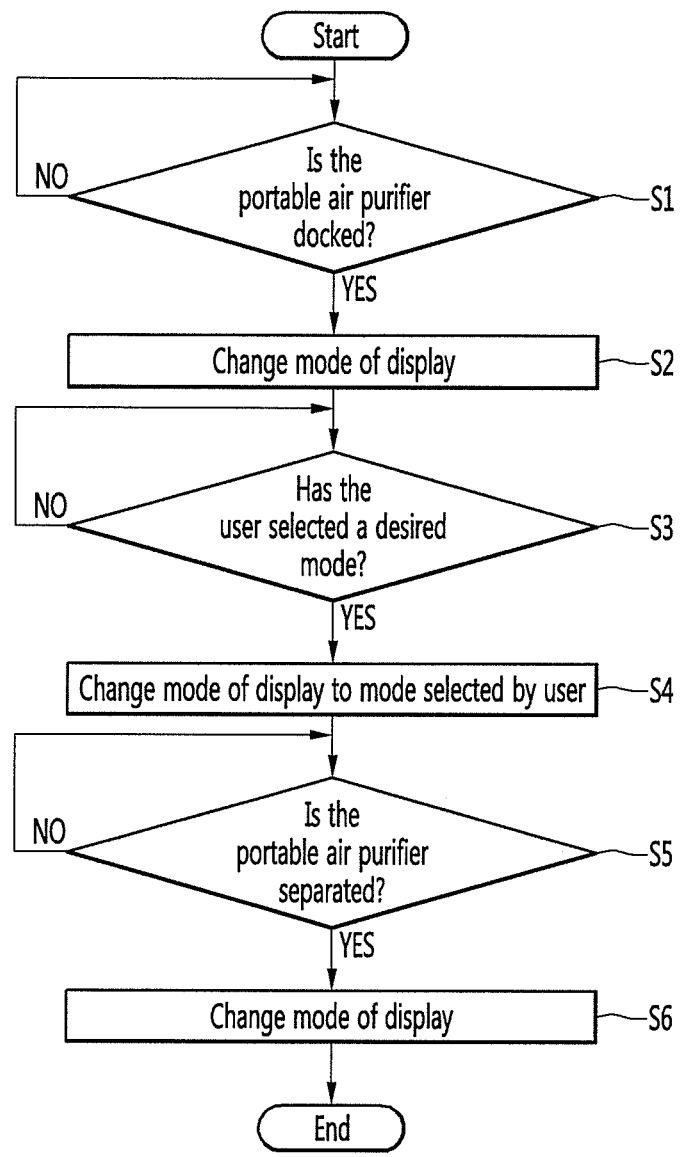

AIR PURIFIER AND PURIFYING SYSTEM

CROSS-REFERENCE TO RELATED APPLICATION(S)

This application claims priority under 35 U.S.C. § 119 to Korean Application No. 10-2019-0031477 filed on Mar. 19, 2019 and 10-2019-0091546 filed on Jul. 29, 2019, whose entire disclosure(s) is/are hereby incorporated by reference.

BACKGROUND

1. Field

The present disclosure relates to an air purifying system and a control method of the air purifying system.

2. Background

An air cleaner or purifier may be a device that suctions contaminated or ambient air, filters or purifies the suctioned air, and then discharges purified air. The air purifier may include a fan to suction outside or ambient air into an interior of the air purifier and a filter to filter dust, germs, etc. from the suctioned air.

An air purifier may be configured to purify a particular interior space such as a home or office. The air purifier may be manufactured in a predetermined shape and size according to a predetermined design. A consumer may purchase an air purifier that best matches a size and capacity desired for a particular indoor space or room, but it is difficult for a consumer to purchase an air purifier that may suit a plurality of indoor spaces in the consumer's unique residential environment or that may suit a variety of situations arising in the residential environment.

WO 2017/026761A1 discloses varying a suction and discharge of air based on a deformable filter in an air purifier. The filter may be modified in accordance with an installation environment of the air purifier. However, using such a filter-modifying technique to customize an air purifier is difficult because it is difficult to know what shape should be implemented for the filter, and the filter must be manually modified by the user. Even if the filter of the air purifier is appropriately modified, the air purifier may still only efficiently clean one particular room or area.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 14 is a flowchart explaining a control method of the air purifying system according to an embodiment.

DETAILED DESCRIPTION OF THE INVENTION

Figure 1:
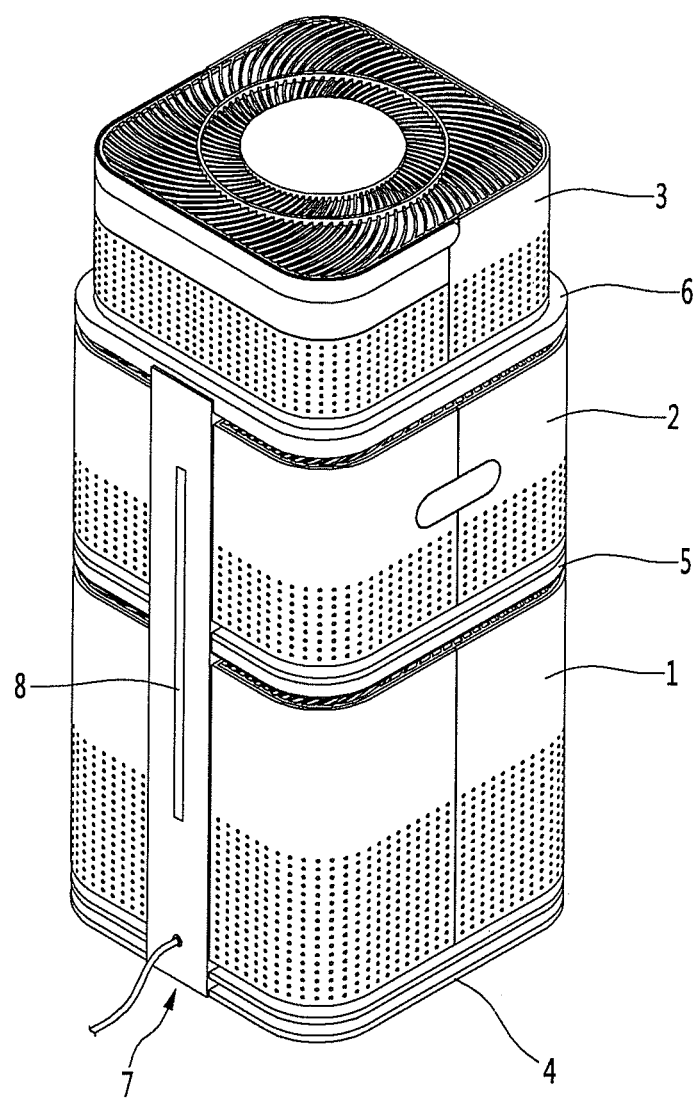
FIG. 1 is a rear perspective view of an air purifying system.

Referring to FIG. 1, an air purifying system according to an embodiment may include at least three air purifiers 1, 2, and 3 capable of independently operating and a docking station 7 for assembling them together. Although the three air purifiers 1, 2, 3 may be moved to various rooms in a residential environment, the docking station 7 may also be moved.

Since the docking station 7 may weigh more than each of the three air purifiers 1, 2, 3 individually, it may be harder for a user to move the docking station. The user may place the docking station 7 in the largest or dirtiest space desired to be cleaned by the user in conjunction with an air purifier among the three air purifiers 1, 2, and 3 having the largest or strongest cleaning capacity. For example, the user may keep the docking station in a living room or family room serving as a main living space where a large amount of air purifying may be required. Air purifiers among the three air purifiers 1, 2, and 3 that weigh less and which may have a smaller or weaker cleaning capacity may be easily removed from the docking station 7 and carried to smaller rooms, rooms having less traffic, or specialized spaces such as a study room, a smaller living room, a bedroom or guest room, or in a kitchen near a stove.

The docking station 7 may be provided with a backbone 8 extending substantially vertically (i.e., upward and downward), a first support or pedestal 4 extending laterally or forward from a bottom of the backbone 8, a second support 5 spaced apart from the first support 4 and extending forward from a middle of the backbone 8, and third support 6 spaced apart from the second support 5 and extending forward from a top of the backbone 8. The three air purifiers 1, 2, and 3 may include a first air purifier 1, a second air purifier 2, and a third air purifier 3. The first support 4 may be configured to support the first air purifier 1, the second support 5 may be configured to support the second air purifier 2, and the third support 6 may be configured to support the third air purifier 3. The first, second, and third supports 4, 5, and 6 may alternatively be referred to as frames or trays.

Each of the first, second, and third air purifiers 1, 2, and 3 may have a rectangular or square horizontal cross-section, but embodiments disclosed are not limited hereto. For example, the first, second, and third air purifiers 1, 2, and 3, may have circular or elliptical horizontal cross sections. Each of the first, second, and third supports 4, 5, and 6 may be provided as a frame having a horizontal cross-sectional shape corresponding to the horizontal cross-sectional shape of each air purifier 1, 2, and 3, respectively. For example, if the first, second, and third air purifiers 1, 2, and 3 have square horizontal cross-sections, the first, second, and third supports 4, 5, and 6 may be square frames. The first, second, and third air purifiers 1, 2, and 3, and the corresponding first, second, and third supports 4, 5, and 6 may have different cross-sectional shapes, or may have similar cross-sectional shapes to make stacking easy and stable. Cross-sectional areas of the first, second, and third supports 4, 5, and 6 may be larger than cross-sectional areas of the first, second, and third air purifiers 1, 2, and 3.

There may be a plurality of air purifiers, and a number of supports may equal a number of air purifiers. Each of the first, second, third, etc. air purifiers 1, 2, and 3 may be separated from respective first, second, third, etc. supports 4, 5, 6 and used separately at different places or rooms.

Alternatively, at least one of the air purifiers 1, 2, and/or 3 may be integrated with its respective support 4, 5, and/or 6 and may not be separated. For example, the first air purifier 1 may be integrated with the first support 4. In this case, any fixing devices used to integrate or secure the first air purifier 1 with the the first support 4 may be provided as a solid base frame. The base frame may support a total load of the air purifying system according to an embodiment. In another case, a base of the first air purifier 1 may be the first support 4, and the first air purifier 1 may be integrated with the backbone 8 and/or the docking station 7, as well. The docking station 7, integrated with the first air purifier 1, may be located in a largest, most trafficked, or dirtiest space in a residential environment. In another alternative, the second air purifier 2 may be integrated with the backbone 8 of the docking station 7 and/or the second support 5. In these alternative embodiments where one of the air purifiers 1 or 2 is integrated with the docking station 7, whichever air purifier 1 or 2 is integrated with the docking station 7 may have the largest or strongest cleaning capacity, and may optionally be heaviest in weight.

For convenience of description, an embodiment where all three air purifiers 1, 2, and 3 are separable from the docking station 7 will be described. In such an arrangement, the first air purifier 1, being docked at the bottom of the docking station 7, may have the largest weight and the largest air cleaning or purifying capacity. The second air purifier 2 may have a smaller air purifying capacity and weight than the first air purifier 1 and a larger air purifying capacity and weight than the third air purifier 3. Air cleaning or purifying capacities may be measured by cubic feet of air per minute or CFM.

The ratio of the air purifying capacities or CFMs of the first, second and third air purifiers 1, 2, and 3 may be, for example, 5:3:2. In this case, the first air purifier 1 may be suitable for a family room or large living room, the second air purifier 2 may be suitable for a smaller living room or bedroom, and the third air purifier 3 may be suitable for a smaller room or space such as a bathroom, study, kitchen area, etc.

Figure 2:
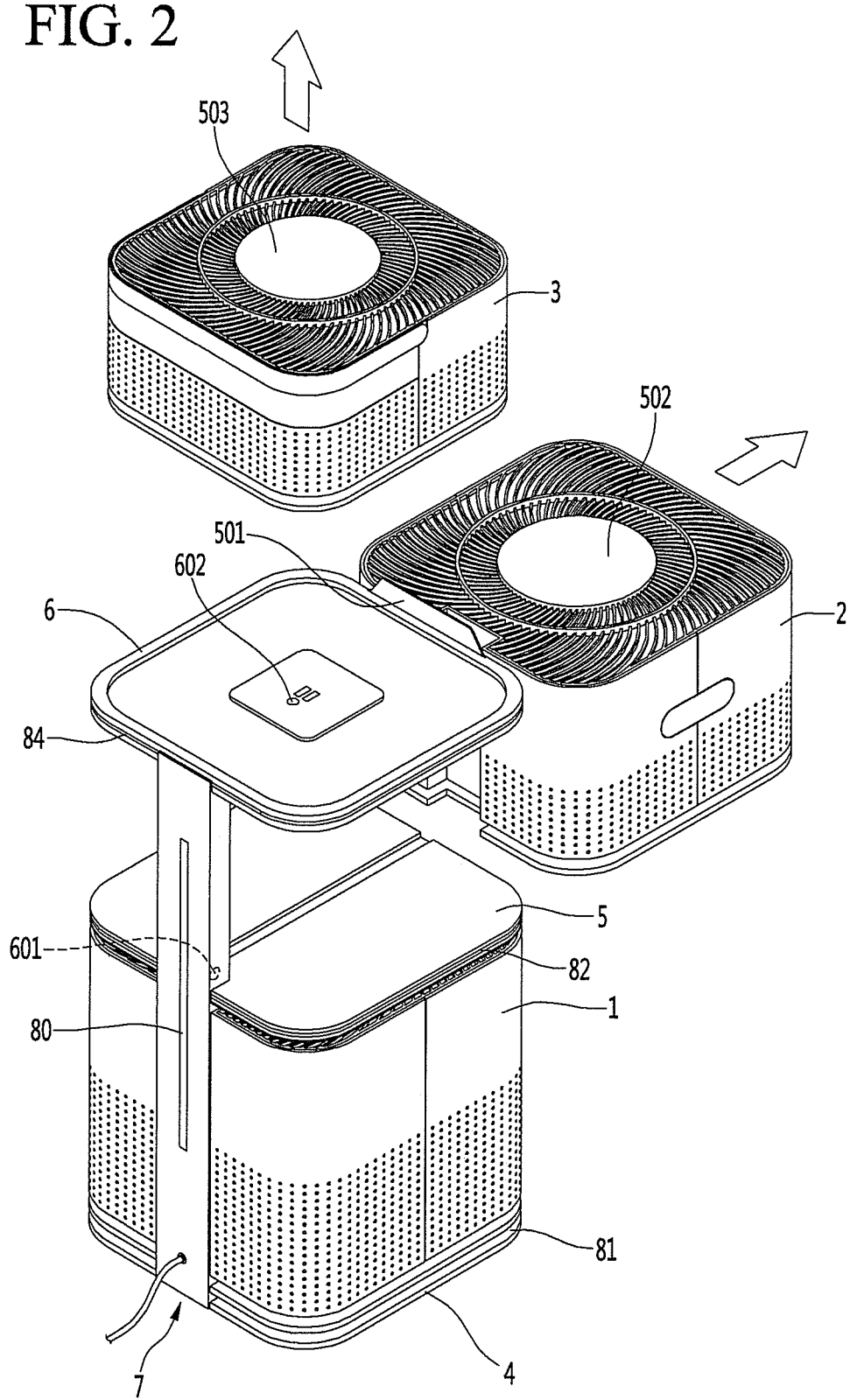
FIG. 2 is a view illustrating a separation method of each air purifier.

Referring to FIG. 2, the first air purifier 1 may have the largest weight among the first, second, and third air purifiers 1, 2, and 3. In a case where the first air purifier 1 is integrated as one body with the docking station 7, a weight of the first air purifier 1 and the docking station 7 may be larger than individual weights of the second and third air purifiers. A center of gravity or mass of the air purifying system may be relatively low, thereby preventing overturning of the docking station 7 due to an external impact and preventing breakage.

The second air purifier 2 may be pushed or slid rearward (i.e., toward the backbone 8) and mounted on the second support 5 of the docking station 7. The second air purifier 2 may be pulled or slid forward (i.e., away from the backbone 8) to be separated from the docking station 7. The third air purifier 3 may be moved downward to be seated or mounted on the third support 6 of the docking station 7. The third air purifier 3 may be lifted upward to be separated and removed from the docking station 7.

When the second and third air purifiers 2 and 3 are mounted on the second and third supports 5 and 6, the docking station 7 and the first and second air purifiers 2 and 3 may communicate with each other (e.g., via wireless communication, BlueTooth communication, wired communication, etc.) When the second and third air purifiers 2 and 3 are mounted on the second and third supports 5 and 6, the first and second air purifiers 2 and 3 may be charged from energy supplied by the docking station 7 via a wireless power transfer or WPT method, other wireless method, or wired method.

Figure 3:
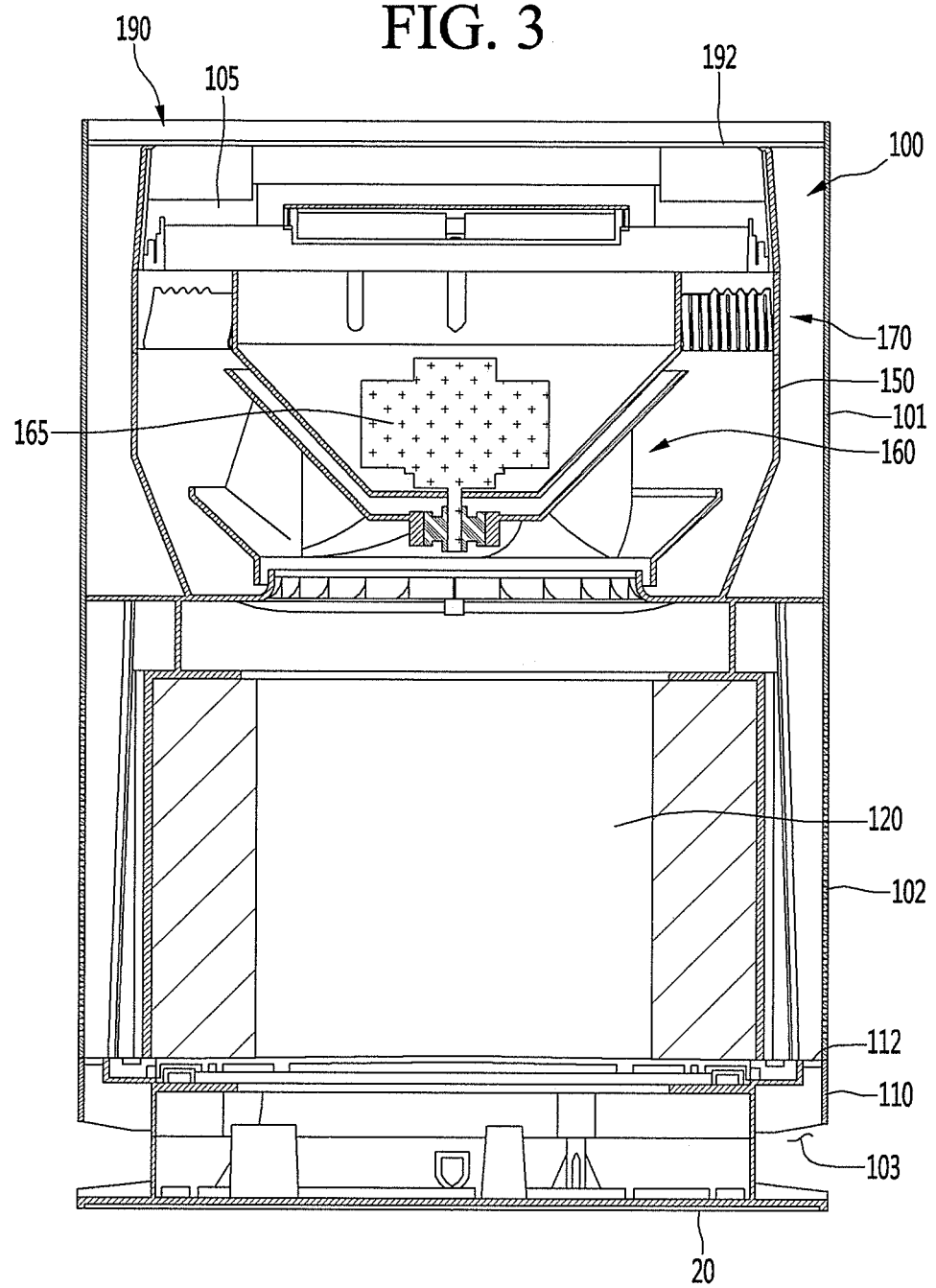
FIG. 3 is a vertical sectional view of the first air purifier.

The first, second, and third air purifiers 1, 3, and 3 may each have a fan 160 and a filter 120 (FIG. 3). The fan 160 may provide negative pressure to suction ambient air through a side of the air purifier 1, 2, or 3 into an interior. Foreign matter in the suctioned air may be filtered by the filter 120, and clean air may be discharged through a top or side surface back to an outside of the air purifier 1, 2, or 3.

The docking station 7 may have a first display 501 to display operation information, and the first air purifier 1 may have an optional display. The second and third air purifiers 2 and 3 may be provided with second and third displays 502 and 503, respectively, to display operation information. Alternatively or in addition thereto, the first, second, and third supports 4, 5, and 6 may also include displays. Based on whether the first, second, and third air purifiers 1, 2, and 3 are docked on the docking station 7 or separated, the first, second, and third displays 501, 502, and 503 may display information on the air purifying system as a whole or on the individual air purifiers 1, 2 and 3, respectively. The first, second, and third displays 501, 502, and 503 may include user interfaces to receive signals based on input from the user. Based on the user's input and/or based on which air purifiers 1, 2, and/or 3 are docked on the docking station 7, the first, second, and third displays 501, 502, and 503 may display individual operating information or operating information of the entire air purifying system. The display 501, 502, and 503 may be provided with a touch panel that can receive a user's operation status together with a screen.

A plurality of lights may be provided on the docking station 7. A first light or backbone light 80 may be provided on a back surface (i.e., a surface facing away from the docked first, second, and third air purifiers 1, 2, and 3) of the backbone 8. The first support may include a second light or first support light 81 provided on an outer rim of the first support 4. A third light or second support light 82 may be provided on an outer rim of the second support 5 82, and a fourth light or third support light 84 may be provided on an outer rim of the third support 6.

Each of the lights 80, 81, 82, and 84 may be operated in various manners depending on the user's preference and on a status of the air purifying system. For example, a user who desires indirect light may turn on the backbone light 80 and the first support light 81. Since the backbone light 80 may emit light that is reflected from a back surface or back wall of the backbone 8 and is therefore more indirect or weaker light. The first support light 81 may be configured to emit stronger or more concentrated light than the backbone light 80, but light from the first support light 81 may appear weaker than light emitted from the second or third support lights 82 and 84 because the first support light 81 may be provided at a bottom of the air purifying system and closer to a ground or floor surface.

A user who desires direct light may turn on at least one of the second support light 82 or the third support light 84. Since the third support light 84 may be provided at a higher position than the second support light 82, light from the third support light 84 may be more direct to a user than the second support light 82. Any combination of lights 80, 81, 82, and/or 84 among the backbone, first support, second support, and third support lights 80, 81, 82, and 84 may be selected and used.

The backbone, first support, second support, and third support lights 80, 81, 82, and 84 may be configured to emit light in accordance with a mounting status or operating status of the first, second, and third air purifiers 1, 2, and 3, an air quality condition, based on other measurements taken, or based on a user's preference. As an example, the backbone light 80 may be configured to emit light that corresponds to a current air quality detected via color (e.g., red for bad air quality and green for good air quality) or by pulsing light (e.g., blinking light for bad air quality). The fourth light 84 may be used to illuminate the indoor room or space in which the docking station 7 is placed. The docking station 7 and/or the first, second, and third air purifiers 1, 2, and 3 may include air quality sensors to detect a pollution level or air quality level of ambient air.

To conveniently and accurately sense a seating or mounting of the second air purifier 2, the backbone 8 may be provided with a first sensor 601 (e.g., hall sensor, touch sensor, weight sensor, light sensor, etc.) A second sensor 602 (e.g., hall sensor, touch sensor, weight sensor, light sensor, etc.) may be provided on an upper surface of the third support 6 to sense a seating or mounting of the third air purifier 3. For convenience of description, an embodiment where the first sensor 601 and the second sensor 602 are hall sensors will be described, and the first and second sensors 601 and 602 will be referred to as first and second hall sensors, respectively.

A first magnet 323 (FIG. 7) may be provided on a back surface of the second air purifier 2 so as to align with the first hall sensor 601 when the second air purifier 2 is docked on the docking station 7. A second magnet 348 (FIG. 8) may be provided on a bottom surface of the third air purifier 3 so as to align with the second hall sensor 602 when the third air purifier 3 is docked or seated on the docking station 7. When the first air purifier 1 is removable from the docking station 7, the docking station 7 may have an optional third hall sensor, and the first air purifier 1 may have an optional third magnet.

When the second and third air purifiers 2 and 3 are mounted on the docking station 7, the magnets 323 and 348 may approach or align with the first and second hall sensors 601 and 602, respectively. The first and second hall sensors 601 and 602 may transmit first and second predetermined signals, respectively, to a controller of the air purifying system. The controller may determine that the second air purifier 2 is mounted upon receipt of the first predetermined signal and determine that the third air purifier 3 is mounted upon receipt of the second predetermined signal.

Although the first, second, and third air purifiers 1, 2, and 3 are provided in similar configurations or structures, the first, second, and third air purifiers 1, 2, and 3 may be different height, length, width, shape, or size. For example, the first air purifier 1 may have a larger height and width than the third air purifier 3. The first air purifier 1 may have a larger height than the second air purifier 2, but an equal width.

Figure 4:
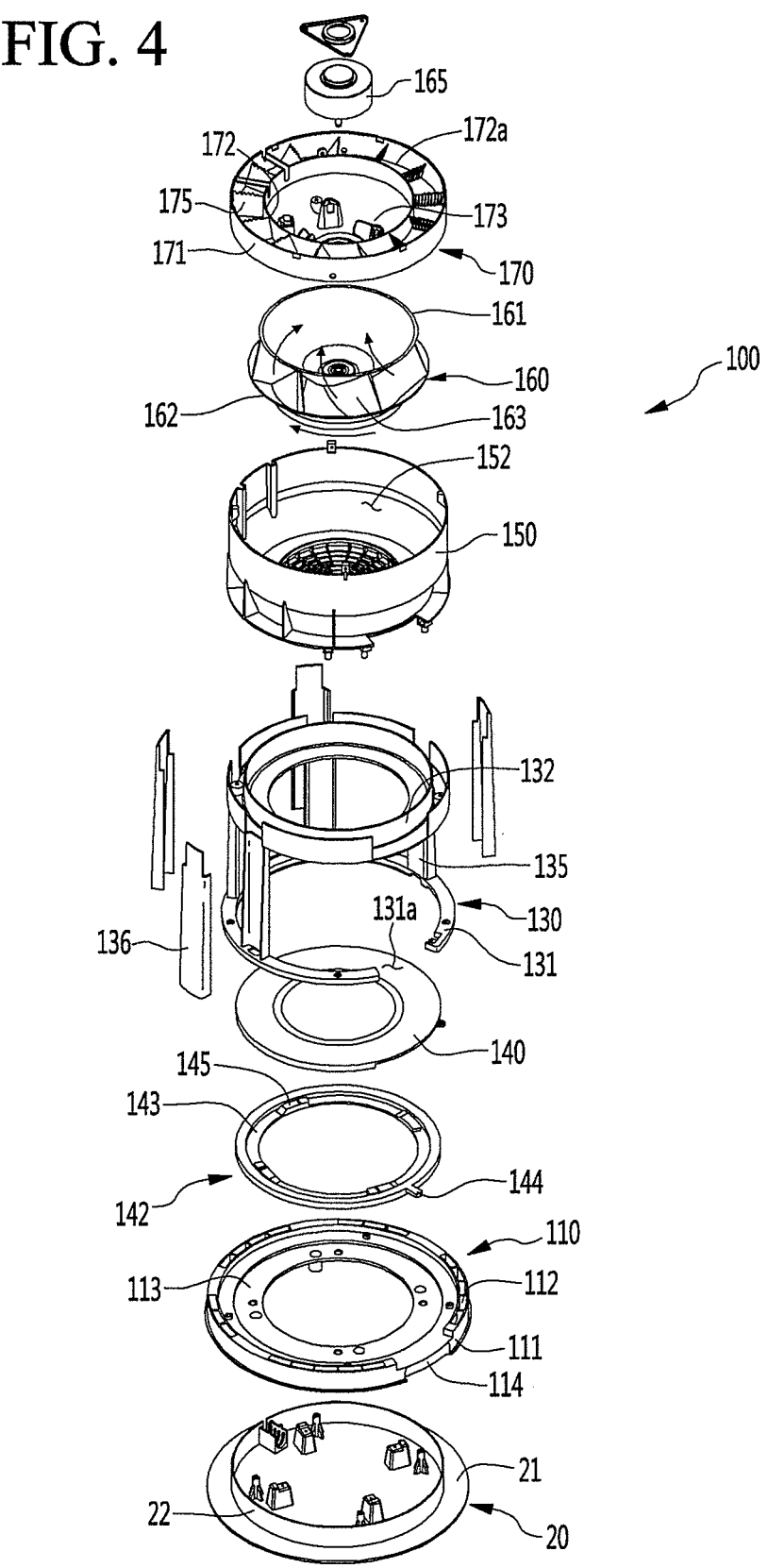
FIG. 4 is an exploded perspective view of a fan and an interior of the each air purifier.

Referring to FIGS. 3 and 4, an internal structure of each of the first, second, and third air purifiers 1, 2 and 3 may be similarly applied. FIG. 3 shows an internal structure of the first air purifier 1, but such an internal structure may be substantially similar to an internal structure of the second and third air purifiers 2 and 3.

The first air purifier 1 may generate an air flow via a fan 160 to suction ambient air from below or at a lower side of the first air purifier 1.

The first air purifier 1 may include a case 101 forming an outer appearance and an outer surface. The case 101 may be provided as a rectangular container (or, if the first air purifier 1 has a cylindrical or round shape, the case 101 may be provided as a cylindrical container). The first air purifier 1 may be referred to as a first air purifying module in that it has a filter and functions to purify the air.

The case 101 may include a separation device or lock in which two shells constituting the case 101 may be joined or separated. The case 101 may further include a hinge provided on a side of the case 101 opposite to a side having the separation device. The two shells constituting the case 101 may rotate about the hinge to open and close the case 101. When the case 101 is opened, the case 101 may be separated from the device inside of the first air purifier 1 for replacement or reparation of the internal devices or components (e.g., the filter 120) of the first air purifier.

A case or side suction portion 102 through which air is suctioned may be formed in a lower portion of the case 101. The side suction portion 102 may be provided with at least one through-hole formed through at least a portion of the case 101. A plurality of through-holes may form the side suction portion 102.

The plurality of side suction portions 102 may be uniformly formed along an outer surface of the case 101 so that air can be suctioned from any direction (i.e., 360°) around the case 101 with respect to a vertical center axis passing through tan inner center of the case 101. Such a configuration of the side suction portions 102 may increase a flow of air into the first air purifier 1. The case 101 may be formed in a rectangular tube shape, and air suctioned through the side suction portions 102 may flow in a substantially radial direction from the outer surface of the case 101.

A vertical direction may be referred to as an axial direction, and a horizontal direction may be referred to as a radial direction. The axial direction may correspond to a central axis or motor axial direction of the fan 160. The radial direction can be understood as a direction perpendicular to the axial direction. A circumferential direction may be a rotation direction around the axial direction.

The first air purifier 1 may include a base 20 provided on a lower side of the case 101. The base 20 of the first air purifier 1 may be placed on a floor or ground surface. The base 20 may be provided below a lower end of the case 101. At least a portion of the base 20 may be laterally or vertically spaced apart from the case 101. The base suction portion 103 may be formed by a space between the case 101 and the base 20.

A suction grill 110 may extend below the lower end of the case 101. The base suction portion 103 may be a space between the base 20 and the suction grill 110, and may include or communicate with a suction port 112 formed in the suction grill 110. The air sucked through the base side suction portion 103 may flow upward through the suction port 112 of the suction grill 110 provided on the upper side of the base 20. When the first air purifier 1 is provided below the second air purifier 2, air discharged from the first air purifier 1 may be suctioned through the base suction portion 103 and the suction port 112. Air present in a lower portion of an indoor space may be easily introduced into the first air purifier 1 through the plurality of side and base suction portions 102 and 103 to increase an intake amount of air.

A discharging port or portion 105 may be formed in an upper portion of the first air purifier 1. The discharge portion 105 may be formed at or under a discharge grill 192 of a discharge guide device or discharge guide 190 provided in the first air purifier 1. The discharge guide 190 may form an upper end of the first air purifier 1, and the discharge grill 192 may form an outer upper surface of the first air purifier 1.

The air discharged through the discharge portion 105 may flow upward in the axial direction. Clean air discharged through the discharge portion 105 may be spread radially by the discharge grill 192. The discharge grill 192 may be an opening formed in a spiral shape such that clean air discharged through the discharge portion 105 may have a velocity component in the circumferential direction.

The first air purifier 1 may further include a suction grill 110 provided at an upper side of the base 20. The base 20 may include a base body 21 configured to be placed on the floor and a base protrusion or flange 22 protruding upward from the base body 21. The base protrusion 22 may surround engagement devices provided on an upper surface of the base body 21 and configured to couple to holes formed in and/or engagement devices on a bottom of the grill body 111. At least a portion of the suction grill 110 and/or the case 101 may be placed on the base protrusion 22.

The base protrusion 22, the base body 21n and the suction grill 110 may be spaced apart from each other. The base suction portion 103 may be formed between the base 20 and the suction grill 110 to form an air suction space provided adjacent to the base body 21 and flange 22, the suction grill 110, and/or a bottom end of the case 101.

The suction grill 110 may include a substantially ring-shaped grill body 111 and an inlet or opening 112 formed at an edge or rim of the grill body 111. The suction ports 112 may be spaced apart from one another along the rim. The plurality of suction ports 112 may communicate with the base suction port 103.

The air purifier 1 may further include a filter 120 provided above the suction grill 110 to filter suctioned air. The air sucked through the side and base suction portions 102 and 103 may pass through an outer peripheral surface of the filter 120. The filter 120 may be cylindrical, and suctioned air may pass through an outer circumferential surface. However, shapes of the filter 120 are not limited hereto. As another example, the filter 120 may have a curved square or rectangle shape or a shape corresponding to an inner contour of the case 101. The filter 120 may have a filter surface to filter air. A type of filter 120 is not limited. For example, the filter 120 may be a HEPA filter, a carbon filter, a pleated filter, a mesh filter or strainer, a foam material, etc. or any combination of these filters.

The suction grill 110 may include a lever support portion or inner edge 113 to form an upper surface of the grill body 111 and to support a lever or locking device 142. The lever support portion 113 may be an inner radial edge recessed from an outer portion or edge of the grill body 111. An outer peripheral surface of the grill body 111 may have a groove portion or opening 114. The groove 114 may provide a space through which a handle or protrusion 144 of the lever device 142 may move.

The lever device 142 may be provided on the suction grill 110 and may be operated by a user. The lever device 142 may include a lever body 143 having a ring shape, and the lever device 142 may be rotated with respect to the suction grill 110 via the handle 144. The filter 120 may be provided on a filter support or support device 140, which may be seated on the lever body 143 of the lever device 142. When the lever device 142 is rotated clockwise or counterclockwise, the filter support 140 may be raised or lowered to fix and loosen the filter 120 for securing and removal.

The lever body 143 may include a lever protrusion or lock 145 protruding upward from an outer edge or rim of an upper surface of the lever body 143. There may be a plurality of lever protrusions 145 provided on the lever body 143 that are spaced apart from each other in the circumferential direction. Each lever protrusion 145 may have an inclined surface that is inclined upward or downward in the circumferential direction. The lever protrusions 145 may engage with a bottom of the filter support 140.

A handle 144 may protrude in the radial direction from the outer edge or an outer peripheral surface of the lever body 143. The user may hold the handle 144 and rotate the lever body 143 clockwise or counterclockwise by rotating the handle 144 in the groove 114.

The filter support 140 may be configured to hold or support the filter 120, and the lever device 142 may support a bottom of the filter support 140. The filter support 140 may include a support protrusion that protrudes downward from an outer edge to contact or engage with the lever protrusion 145. There may be a plurality of support protrusions corresponding to the plurality of lever protrusions 145. Each support protrusion may have an inclined surface upward or downward in the circumferential direction.

When the lever body 143 is rotated via the handle 144, the lever protrusion 145 may be rotated together with the lever body 143 and may rotate relative to the support protrusions of the filter support 140. When an upper or higher portion of the lever protrusion 145 abuts or contacts a lower portion of the support protrusion, the filter support 140 may be pushed upward to fix a position of the filter 120 into a secured state. In such a configuration, the inclined surfaces of the lever protrusion 145 and the support protrusion may not exactly align. When a lower portion of the lever projection 145 contacts or abuts an upper or higher portion of the support protrusion, the filter support 140 may descend downward to place the filter 120 into a removable state. In such a configuration, the inclined surfaces of the lever protrusion 145 and the support protrusion may be aligned. When the filter support 140 is descended downward, a space may be formed so that the filter 120 may be removed from the second air purifier 2.

The first air purifier 1 may further include a filter frame 130, which may form a space in which the filter 120 may be mounted. The filter frame 130 may include a first or lower frame 131 forming a lower portion of the filter frame 130 and a second or upper frame 132 forming an upper portion of the filter frame 130.

The first frame 131 may have an approximate ring shape. A ring-shaped inner space of the first frame 131 may form at least a part of an air passage or channel passing through the filter frame 130. However, a shape of the first frame 131 is not limited to a ring shape, and may be configured to correspond to an outer contour of the filter 120.

The lever device 142 and the filter support 140 may be positioned on an inner peripheral surface of the first frame 131. An upper surface of the filter support 140 may include a seating surface on which the filter 120 is placed. The first frame 131 may include a cutout portion or handle space 131a to allow movement of the handle 144 of the lever device 142. The handle 144 may be rotated clockwise or counterclockwise in the handle space 131a to rotate the filter support 140.

The second frame 132 may be spaced upward from the first frame 131. The second frame 132 may have an approximate ring shape. A ring-shaped inner space of the second frame 132 may form at least a part of the air path passing through the filter frame 130. However, a shape of second frame 132 is not limited to a ring shape, and may be configured to correspond to an outer contour of the filter 120.

The upper portion or surface of the second frame 132 may support a fan housing 150, which will be described later. A skirt on an outer periphery of the second frame 132 may hold the filter 120 by holding the lifted filter 120.

The filter frame 130 may further include a side support or wall 135 extending upward from the first frame 131 toward the second frame 132. The first and second frames 131 and 132 may be spaced apart from each other by the side support 135. A plurality of side supports 135 may be arranged in the circumferential direction and connect rims of the first and second frames 131 and 132.

The mounting space in which the filter 120 is placed may be defined by the first and second frames 131 and 132 and the plurality of side supports 135. The filter 120 can be detachably mounted in the mounting space. The filter 120 may have a cylindrical shape, and air may be introduced through the outer circumferential surface of the filter 120 to remove impurities such as fine dust, pollutants, or dirt.

Since the filter 120 may have a cylindrical or curved shape, air may be introduced in any direction with respect to the filter 120. Accordingly, the filter surface may be increased in area, and an amount of air can suctioned through the filter 120 may be increased.

The mounting space may have a shape (e.g., cylindrical) corresponding to the shape of the filter 120. The filter 120 may be slidably received in the mounting space during a mounting process and may be be slidably drawn out from the mounting space in a separating process.

When the handle 144 is operated to separate the filter 120, the filter 120 and the filter support 140 may move downward to a release position. A space may be formed below the mounting space to increase an overall distance between the filter support 140 and the second filter frame 132, and the filter 120 may be slid radially outward and separated from the mounting space. After removal, a new or replacement filter 120 may be slid radially inward toward the mounting space to be placed on the upper surface of the filter support 140. When the handle 144 is operated to secure the filter 120, the filter 120 and the filter support 140 may be brought closer to the second frame 132, and the filter 120 can be placed in a coupling or mounting position.

A support cover 136 may be coupled to an outside of the side support 135. There may be a plurality of support covers 136 corresponding to a plurality of side supports 135 to cover the side supports 135.

The first air purifier 1 may be provided with a suction device or assembly 100 to provide an inflow or suction pressure to suction air into the side and base suction portions 102 and 103 and to the filter 120. The suction device 100 may be provided above the filter 120 suction filtered air from the filter 120 upward.

The suction device 100 may include a fan housing 150 installed or located at an outlet side of (i.e., above) the filter 120. A fan or blower 160 may be provided in the fan housing 150. The fan housing 150 may be supported by the second filter frame 132 of the filter frame 130.

There may be a fan 160 inside each of the first, second, and third air purifiers 1, 2, and 3. Each fan 160 may have a circular cross-section even though each air purifier 1, 2, and 3 may have a square cross section. The case 101 and the suction device 100 may be spaced apart from each other if the oblique line providing the sectional view of FIG. 3 is taken as a diagonal line of a horizontal polygonal square of the air purifier.

A fan inlet or opening 152 provided in a lower portion of the fan housing 150 may guide an inflow of air in the fan housing 150. The fan inlet 152 may include a grill to prevent fingers or other objects from going into the fan housing 150 during removal and insertion of the filter 120.

The fan 160 may rotate to suction air through the side and base suction portions 102 and 103 and the filter 120. The fan 160 may be positioned above the fan inlet 152. The fan 160 may be a centrifugal fan that introduces air in the axial direction and discharges air upward in the radial direction.

The fan 160 may include a hub 161 to which a rotation shaft of a fan motor 165 is coupled, a shroud 162 spaced apart from the hub 161, and a plurality of blades 163 provided between the shrouds 162. The fan motor 165 may be coupled to the fan 160 and may be a centrifugal fan motor.

The hub 161 may have a bowl shape having a diminishing diameter in a downward direction. The hub 161 may include a shaft coupling portion to which the rotation shaft is coupled and a first blade coupling portion that extends obliquely upward from the shaft coupling portion. The shroud 162 may include a lower end portion formed with a shroud inlet port through which air having passed through the fan inlet 152 is suctioned. A second blade coupling portion may extend upward from the lower end portion.

One side of the blade 163 may be coupled to the first blade coupling portion of the hub 161, while the other side of the blade 163 may be coupled to the second blade coupling portion of the shroud 162. The plurality of blades 163 may be spaced apart from each other in the circumferential direction of the hub 161.

Air passing through the filter 120 may flow upward into the fan housing 150 through the fan inlet 152. The air from the filter 120 may flow in the axial direction of the fan 160 and flow out through the blade 163. An edge of the blade 163 may be inclined or curved outward and upward to correspond to the flow direction of the air so that outflowing air can flow upward in the radial direction.

The suction device 100 may further include an air guide 170 coupled to an upper side of the fan 160 to guide the flow of the air passing through the fan 160. The air guide 170 may be positioned above the fan housing 150. The air guide 170 may be configured to be stacked on top of the fan housing 150. For example, the air guide 170 may have an outer diameter equal or similar to an outer diameter of an upper rim of the fan housing 150 to guide the flow discharged from the fan 160.

The air guide 170 may include an outer wall 171 and an inner wall 172 located inside the outer wall 171 so that the outer wall 171 surrounds the inner wall 172. The outer and inner walls 171 and 172 may have a cylindrical shape. A diameter of the outer wall 171 may be larger than a diameter of the inner wall 172, and a first air passage 172a through which air from the fan 160 flows may be formed between an inner circumferential surface of the outer wall 171 and an outer circumferential surface of the inner wall 172. The diameter of the outer wall 171 may be an outer diameter of the air guide 170 and the diameter of the inner wall 172 may be an inner diameter of the air guide 170.

The air guide 170 may further include a motor receiving portion or cavity 173 extending downward from the inner wall 172 to receive the fan motor 165. The motor receiving portion 173 may have a bowl shape having a diminishing diameter in the downward direction. A motor coupling part may be provided at a side of the fan motor 165 to guide and fix the fan motor 165 into the air guide 170.

A shape or inner contour of the motor receiving portion 173 may correspond to a shape or outer contour of the hub 161. The motor receiving portion 173 may be inserted into the hub 161.

The fan motor 165 may be supported on the upper side of the motor receiving portion 173. The rotation shaft of the fan motor 165 may extend downward from the fan motor 165 and may extend through a hole or opening in a bottom portion of the motor receiving portion 173 to be coupled to the shaft coupling portion of the hub 161.

The air guide 170 may further include a guide vane or rib 175 provided in the first air passage 172a. The guide vane 175 may extend from the outer circumferential surface of the inner wall 172 to the inner circumferential surface of the outer wall 171. There may be a plurality of guide vanes 175 spaced apart from each other in the circumferential direction. The guide vanes 175 may add structural rigidity to the air guide 170.

The plurality of guide vanes 175 may guide air introduced into the first air passage 172a of the air guide 170 upward from the fan 160. The guide vanes 175 may extend obliquely upward to be rounded or curved. A shape of the guide vanes 175 may be configured to guide the air upward.

The suction device 100 may further include the discharge guide 190 having the discharge port 105 so that air passing through the air guide 170 may be discharged to an outside or exterior of the first air purifier 1. The discharge portion 105 may be provided with the discharge grill 192 so that clean air output in the axial direction and the radial direction may have a velocity component in the circumferential direction. The discharge grill 192 may be formed in a spiral shape to guide the air in the circumferential direction.

Figure 5:
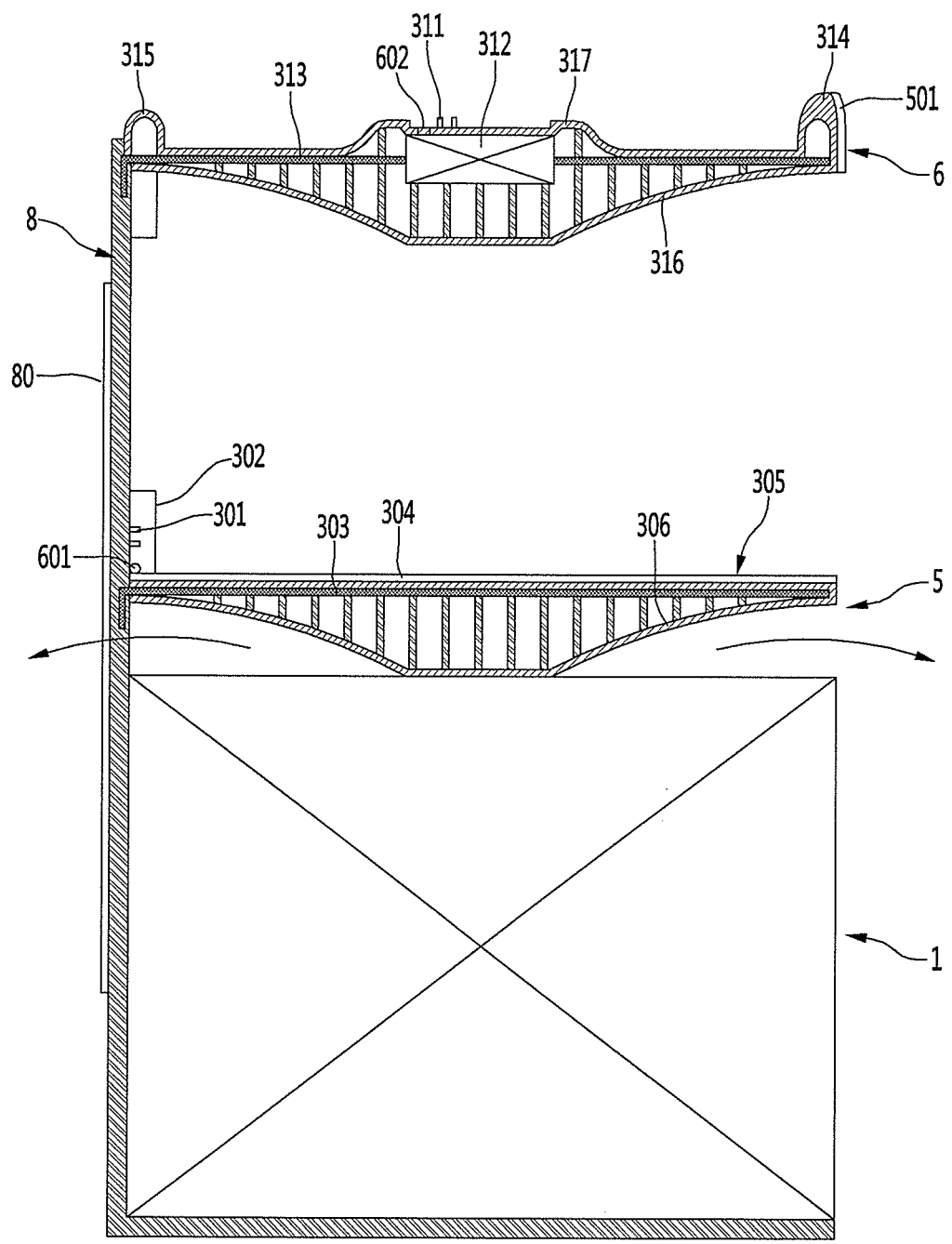
FIG. 5 is a schematic cross-sectional view of a docking station or support frame.

Referring to FIG. 5, the backbone 8, may extend upward from a back or rear side of the first air purifier 1. The backbone 8 may serve as a framework to support a weight of the first air purifier 1 and any air purifiers 2 or 3 or parts placed on the first air purifier 1. The backbone 8 may be formed in a bar shape and may be made of a rigid material such as a resin, steel, or wood. The backbone 8 may be painted.

The backbone 8 may be provided with a first light 80 that is fixed to a rear side of the backbone 8. The first light 80 may have an elongated shape that extends in a longitudinal direction of the backbone. The first light 80 may emit light in a visible wavelength range (i.e., visible light). The first light 8 may be implemented to inform the user of a position or operation status of the air purifying system, or may be used to illuminate a space surrounding the air purifying system.

The second support 5 supporting the second air purifier 2 may extend forward from the backbone 8 at a position slightly higher than a top of the first air purifier 1. The second support 5 may be fastened to the backbone 8. Alternatively or in addition thereto, a bottom of the second support 5 may be fastened to or supported by the top of the first air purifier 1. For example, when the first air purifier 1 is not removable from the backbone, the second support 5 may be rigidly fixed to the top of the first air purifier 1 for added support, but embodiments disclosed are not limited hereto. In such a configuration, the first air purifier 1 may support a weight of the second support 5 and the second air purifier 2. As another example, the second support 5 may be rigidly attached to the backbone 8, and the bottom of the second support 5 may contact the top of the first air purifier without being fixed. The second support 5 may be positioned as close as possible to the top of the first air purifier 1 in the vertical direction to reduce an overall height and size of the air purifying system.

An upper surface of the second support 5 may have a rectangular or square shape to correspond to a shape of a bottom of a base 20 (FIG. 20) of the second air purifier 2. The second support 5 may stably guide a seating or mounting process of the second air purifier 2 and may support the seated second air purifier 2.

The upper surface of the second support 5 may be defined by an upper surface of an upper frame or pedestal 305. The upper frame 305 may be configured to support a weight of the second air purifier 2 and to receive an entire bottom surface of the second air purifier 2. The upper frame 305 may be supported by a lower frame or beam 303. The upper frame 305 may be made of a resin material, for example, and the lower frame 303 may be made of a strong material such as metal.

The upper frame 305 and the lower frame 303 may be formed separately and later integrated (e.g., welded, bonded adhered). Alternatively, the upper and lower frames 305 and 303 of the second support 5 may be formed integrally as a member by, for example, injection molding.

A rail 304 may protrudes upward from the upper surface of the upper frame 305 and extend in a longitudinal direction or forward. A bottom of the second air purifier 2 may have a rail seating roove or recess 314 (FIG. 6) configured to slide along the rail 304. A second support connection terminal 301 and a second support wireless charging module 302 may be provided in the backbone 8 at a position adjacent to a rear of the upper frame 305. When the second air purifier 2 is seated on the second support 5, a rear of the second air purifier 2 may connect to the second support connection terminal 301 or be aligned with the second support charging module 302. Details of a coupling of the second.

Figure 6:
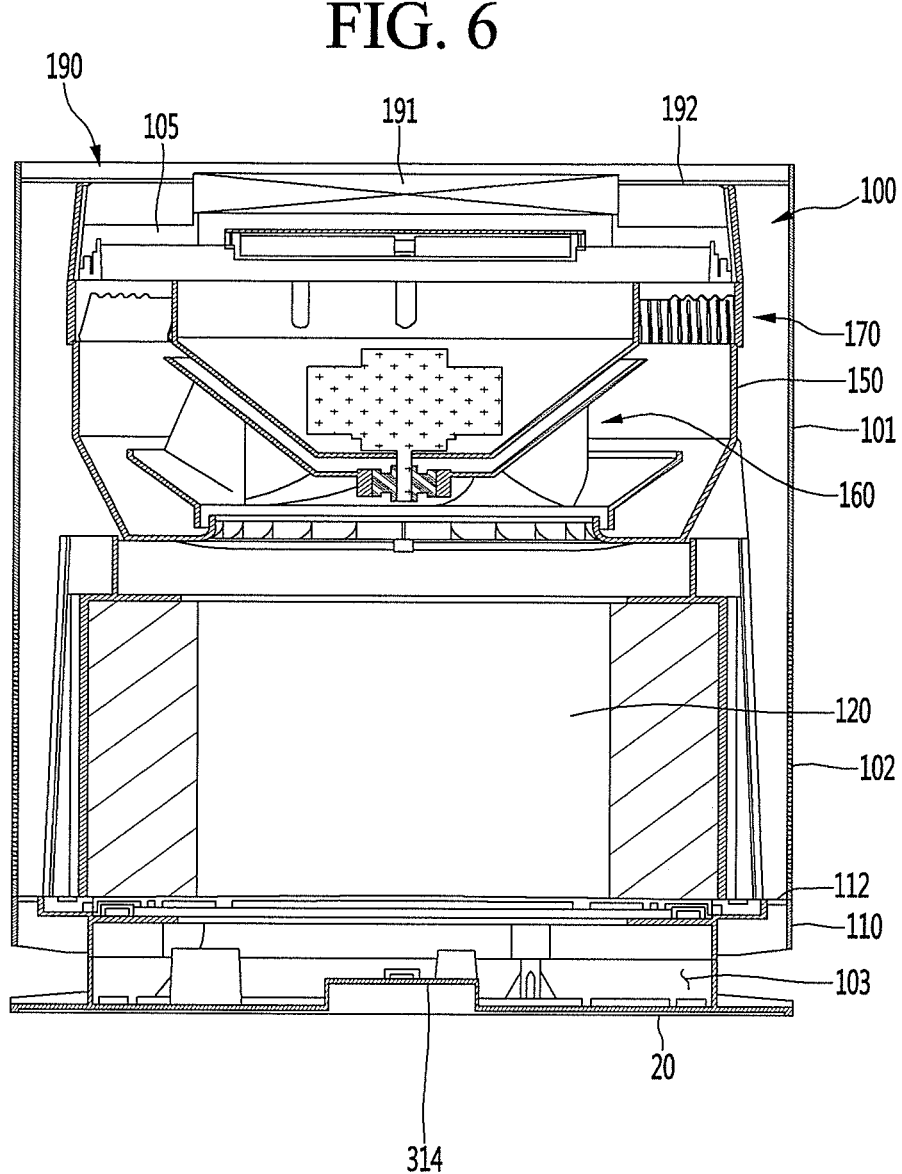
FIG. 6 is a sectional view of a second air purifier.

Referring to FIG. 6, the second air purifier 2 may have a shorter height than that of the first air purifier 1 and may have a smaller air cleaning or purifying capacity than that of the first air purifier 1. A function and action of the second air purifier 2 may be similar to the first air purifier 1 despite being smaller and having a decreased air cleaning capacity.

An interior of the second air purifier 2 may be substantially similar to an interior of the first air purifier 1, and the second air purifier 2 may include a case 101, a base 20, side and base suction portions 102 and 103, a suction grill 110 and suction port 112, a removable filter 120 (e.g., a filter removable from a filter frame and seated on a filter support), a fan 160 provided in a fan housing 150, an air guide 170, and a discharge guide 190 having a discharge grill 192. The second air purifier 2 may optionally include a display 191. The display 191 may show an operation status of the second air purifier 2, temperature information, time information, air quality information, etc. The display 191 may also serve as a light.

A rail seating groove 314 may be provided on the bottom of the second air purifier 2. The rail seating groove 314 may have a size, shape, length, and position corresponding to that of the rail 304 so that the second air purifier 2 may be seated on the second support 5 by sliding the rail seating groove 314 onto the rail 304 in the longitudinal direction.

Embodiments disclosed herein are not limited to the rail seating roove 314 being provided on the second air purifier 2 and the rail 304 being provided on the second support 5. For example, the rail 304 may protrude from a bottom of the second air purifier 2 to insert into the rail seating groove 314 formed as a recess in the second support 5. However, after being separated from the docking station 7, the second air purifier 2 may be more stably seated on the floor or on a counter when the second air purifier 2 has the rail seating groove 314 instead of the rail 304. As another example, there may be a plurality of rails 304 corresponding to a plurality of rail seating grooves 314.

Figure 7:
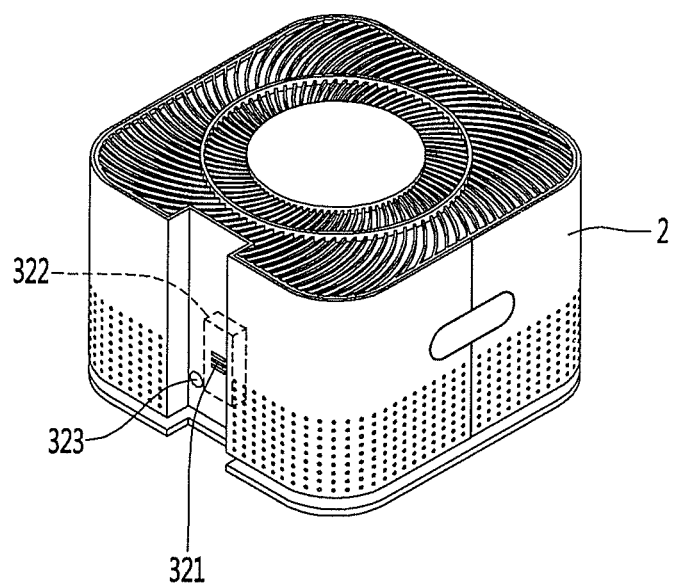
FIG. 7 is a rear perspective view of the second air purifier.

Referring to FIGS. 5-7 to describe a connection of the second air purifier 2 onto the second support 5, a rear portion of the second air purifier 2 may include a second purifier connection portion or terminal 321 corresponding to the second support connection terminal 301 of the second support 5. The second purifier connection portion 321 may be configured to electrically connect or couple to the second support connection terminal 301 of the second support 5. The second air purifier 2 may also include a second purifier charging module 322, which may electrically couple or interact with the second support charging module 302. The second purifier and support charging modules 322 and 302 may be wireless charging modules implementing a wireless transfer process (WPT) or electromagnetic induction. The second purifier and support charging modules 322 and 302 may include wireless power transceivers, transmitters, and/or receivers.

The second support connecting terminal 301 and the second purifier connecting portion 321 may be connected to each other when the rail seating groove 314 of the second air purifier 2 is slid onto the rail 304 of the second support 5 and the rear of the second air purifier 2 contact the front of the backbone 8. In such a position, the second purifier and support charging modules 322 and 302 may be aligned. The rear of the second air purifier 2 may have a groove or recess configured to fit onto the backbone 8.

A physical wired connection may be completed in such a position as the second support connection terminal 301 is fitted to the second purifier connection portion 321. For example, of the second support connection terminal 301 or the second purifier connection portion 321 may have electrodes, and the other may include grooves or recesses that the electrodes fit into. A signal connection between the second support and purifier charging modules 302 and 322 may be completed wirelessly without physical contact, and wireless charging may be performed.

Upon connecting the second support connection terminal 301 and the second purifier connecting portion 321, the second air purifier 2 may communicate with other components or devices (e.g., fan motors 165, displays 191, etc.) provided in the entire air purifying system. As another example, wire charging may be performed. Alternatively or in addition thereto, the docking station 7 may have a controller and a communication module, and the first, second, and/or third air purifiers 1, 2, and/or 3 may have a communication module to communicate with communication modules of the docking station 7 or of other air purifiers. The communication modules may have WiFi or BlueTooth modules, for example. The first, second, and third supports 4, 5, and 6 may include optional or alternative communication modules.

Positions of the second support connection terminal 301 and the second support charging module 302 may not be limited to a front surface of the backbone 8; for example, the second support connection terminal and charging module 301 and 302 may be provided on the upper frame 305 of the second support 5, and a bottom of the second air purifier 2 may include the second purifier connection portion and charging module 321 and 322 to correspond to the second support connection terminal and charging module 301 and 302, respectively. However, a user may be able to recognize a complete connection when the second support connection terminal and charging module 301 and 302 are provided in the backbone 8, and the second air purifier 2 may be more stably positioned on the second support 5 and more closely contact the second support 5 and the backbone 8.

Referring back to FIG. 5, the second support 5 may be configured to adjust or guide air flow. The lower frame 303 may include a flow guide 306 formed as a lower surface or portion of the second support 5. The flow guide 306 may have a concave curvature from the bottom of the second support 5, which may be provided at a center, upward and outward toward the upper frame 305. The flow guide 306 may be symmetrical in a radial direction, and may resemble a trumpet head shape.

Figure 12:
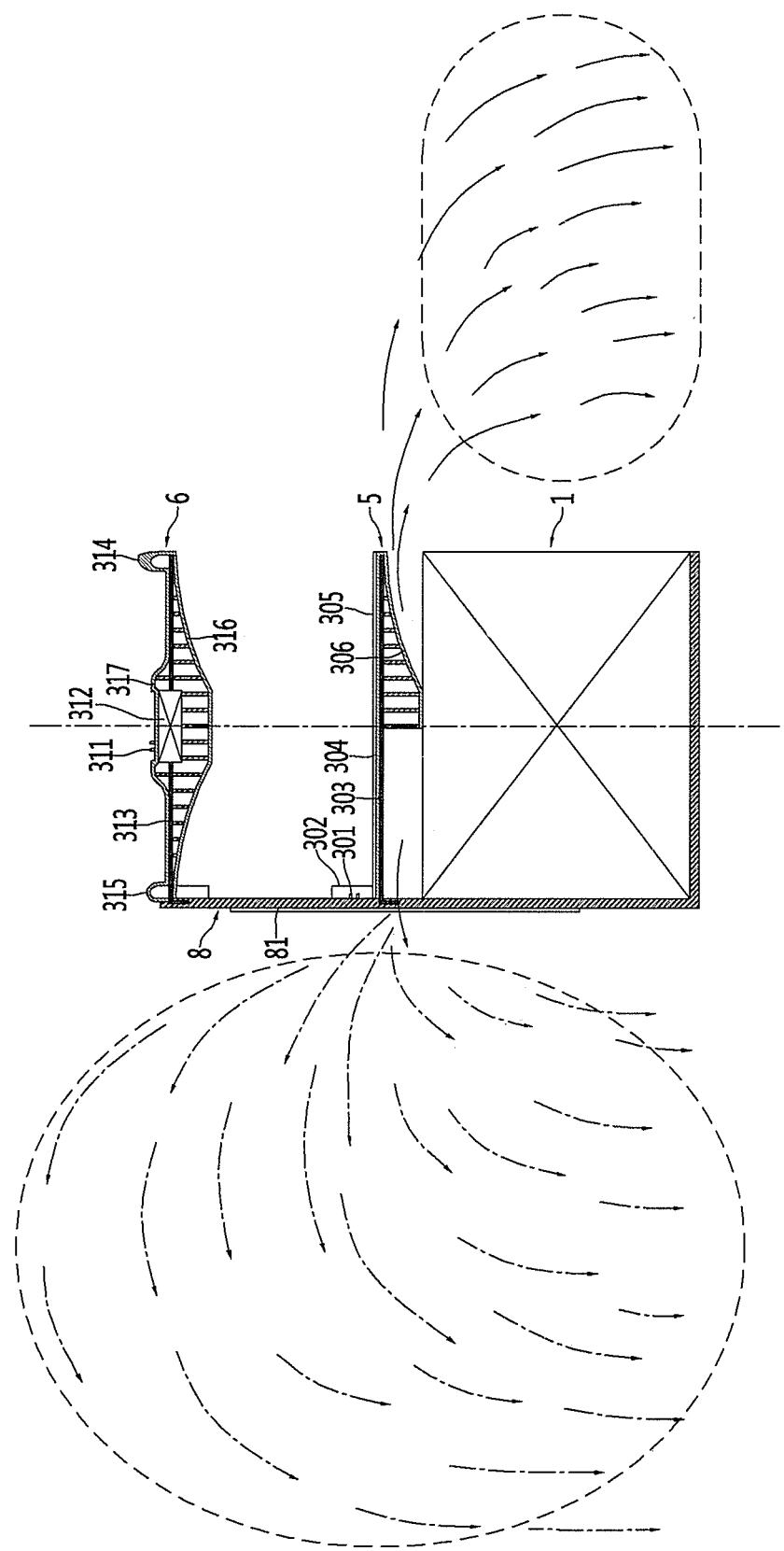
FIG. 12 is a view showing an air flow according to a flow guide.

The flow guide 306 may guide air discharged from the first air purifier 1, which may flow in axial and/or radial directions, to flow in the radial direction out toward sides of the air purifying system. The air may be guided by the flow guide 306 to a region to the side of the air purifying system, which may begin to become concentrated with clean air. (FIG. 12, region on the right hand side). This region may be altered depending on how many air purifiers are docked on the docking station.

Figure 8:
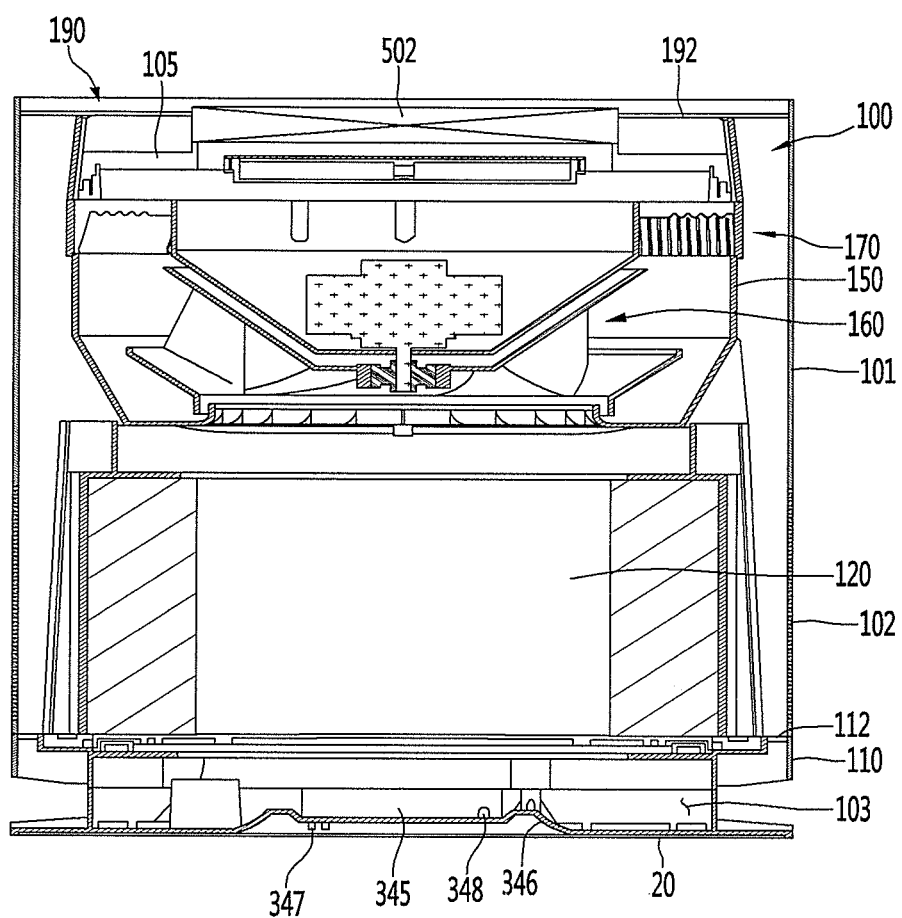
FIG. 8 is a sectional view of the third air purifier.
Figure 9:
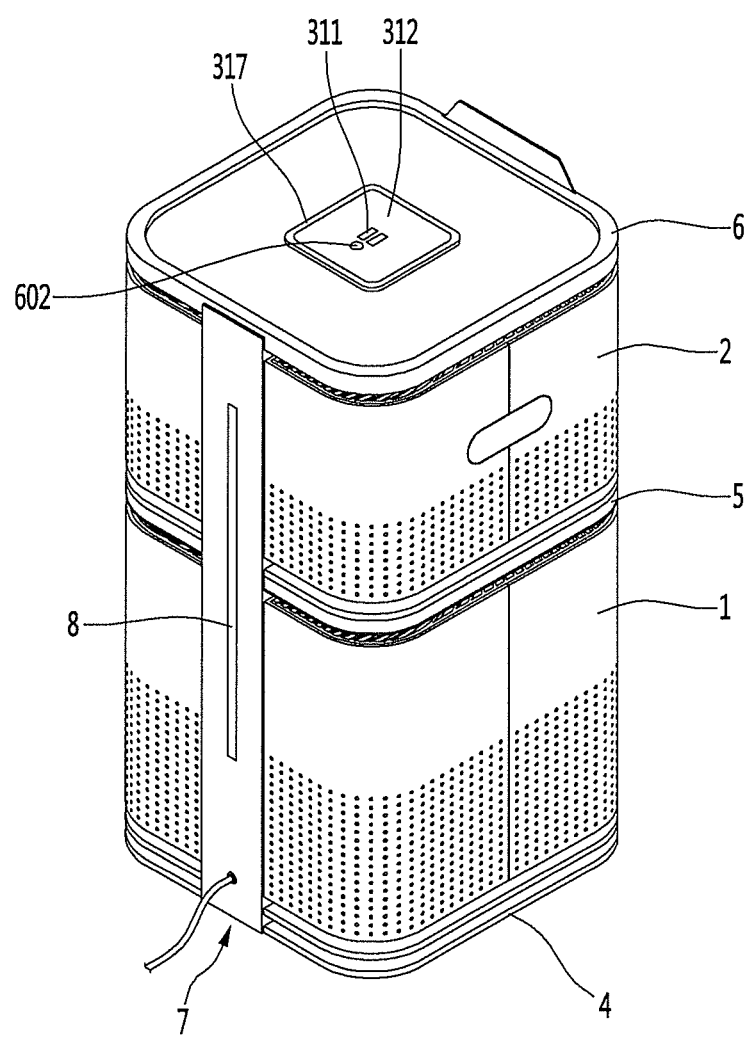
FIG. 9 is a rear perspective view of the air purifying system with the third air purifier removed.

Referring to FIGS. 5, 8 and 9, the third support 6 may be provided at an upper end of the backbone 8. The third support 6 may include an upper frame 315 and a lower frame 313, which may have similar functions and structures to those of the upper frame 305 and the lower frame 305 of the second support 5. However, an edge or rim of the upper frame 315 may protrude slightly upward so as to form a sidewall or protrusion to contain and/or support the third air purifier 3 and prevent displacement or shifting of the third air purifier 3 when the third air purifier 3 is seated on the third support 6. The third air purifier 3 may remain stably supported on the third support 6 if an external impact is applied to the docking station 7, backbone 8, or the air purifying system.

The third support 6 may have a similar structure to the second support 5, and differences between the second and third supports 5 and 6 will be described hereinafter. A description of similar features may be omitted.

The third support may include a fitting bar or support 314 protruding upward from a front end or side of the upper frame 315. The fitting bar 314 may also be referred to as an alignment bar 314. A fitting protrusion 317 may protrude upward from a center of the upper frame 315. The fitting bar 314 and the fitting protrusion 317 may maintain a position of the third air purifier 3 on the upper frame 315. The fitting bar 314 may have an optional display provided on a front face so that the user may see a display status without bending over a top of the third air purifier 3.

The fitting bar 314 may make it easier for a user to gauge where to grasp the third air purifier 3 during removal and placement. For example, a user standing in front of the air purifying system may place the third air purifier 3 down on the upper frame 315 and gauge a left-right alignment between the third air purifier 3 and the third support 6. However, alignment in the anteroposterior direction (i.e., front-back direction) may not be easily gauged from his field of view, and so the fitting bar 314 may assist the user in approximating a front-back alignment of the third air purifier 3.

The fitting protrusion 317 may also assist in maintaining an alignment of the third air purifier 3 when the third air purifier 3 and the third support 6 are approximately aligned by the fitting bar 314. The protruding rim of the upper frame 315 may maintain an alignment of a base 20 of the third air purifier 3.

Wired and/or wireless connections between the third air purifier 3 and the third support 6 may be safely performed when the protruding rim of the upper frame 315, the fitting protrusion 317, and the fitting bar 314 are used as alignment guides. The third support 6 may include a third support connection terminal 311 and a third support charging module 312, which may have similar functions to the second support connection terminal and charging module 301 and 302, respectively. The third support connection terminal 311 and a third support charging module 312 may be provided in a recessed portion of the fitting protrusion 317, as an example.

Referring to FIGS. 8 and 9, the third air purifier 3 may include a seating or fitting groove or recess 346 having an inner contour corresponding in size and shape to an outer contour if the fitting protrusion 317. The fitting protrusion 317 may be inserted into the fitting groove 346 to maintain a position of the third air purifier 3 on the third support 6. When the fitting protrusion 317 and the seating groove 346 are fitted to each other, the third air purifier 3 may not rock or fall when an external is applied.

A third purifier charging module 345 and a third purifier connection terminal or portion 347 may be provided in the seating groove 346 to correspond to the the third support charging module 312 and the third support connection terminal 311, respectively. The third purifier charging module 345 and a third purifier connection terminal or portion 347 may have functions similar to the second purifier charging module and connection portion 322 and 321, respectively. Therefore, a detailed description thereof will be omitted.

An interior of the third air purifier 3 may be substantially similar to an interior of the first and second air purifier 1 and 2, and the third air purifier 2 may include a case 101, a base 20, side and base suction portions 102 and 103, a suction grill 110 and suction port 112, a removable filter 120 (e.g., a filter removable from a filter frame and seated on a filter support), a fan 160 provided in a fan housing 150, an air guide 170, and a discharge guide 190 having a discharge grill 192 and a discharge portion 105. The third air purifier 3 may optionally include a display 502. The display 502 may show an operation status of the third air purifier 3, temperature information, time information, air quality information, etc. The display 502 may also serve as a light.

Referring back to FIG. 5, the third support 6 may include a flow guide 316 similar to the flow guide 306 of the second support 5. The flow guide 316 may be provided on a lower surface of the lower frame 313 of the third support 6 and have a shape, structure, and configuration similar to the flow guide 306 of the second support 6. A distance between the flow guide 316 and the second air purifier 2 may be adjusted to adjust a direction and speed of the air discharged from a top of the second air purifier 2 in the radial direction.

The third support 6 may be connected to the backbone 8, and may only be supported by a top of the second air purifier 2 when the second air purifier 2 is docked on the docking station 7. The third support 6 may sag or become deformed by a weight of the third air purifier 3, and the third support 6 may be susceptible to deeper sagging after repeated use. Sagging may prevent a seamless or easy insertion of the second air purifier 2 onto the second support 5. To prevent sagging, the third support 6 may be configured to be slightly inclined upward (e.g., on the order of centimeters or milli-meters) from the backbone 8. However, such an inclination is optional, and the third support 6 may alternatively be flat.

Figure 10:
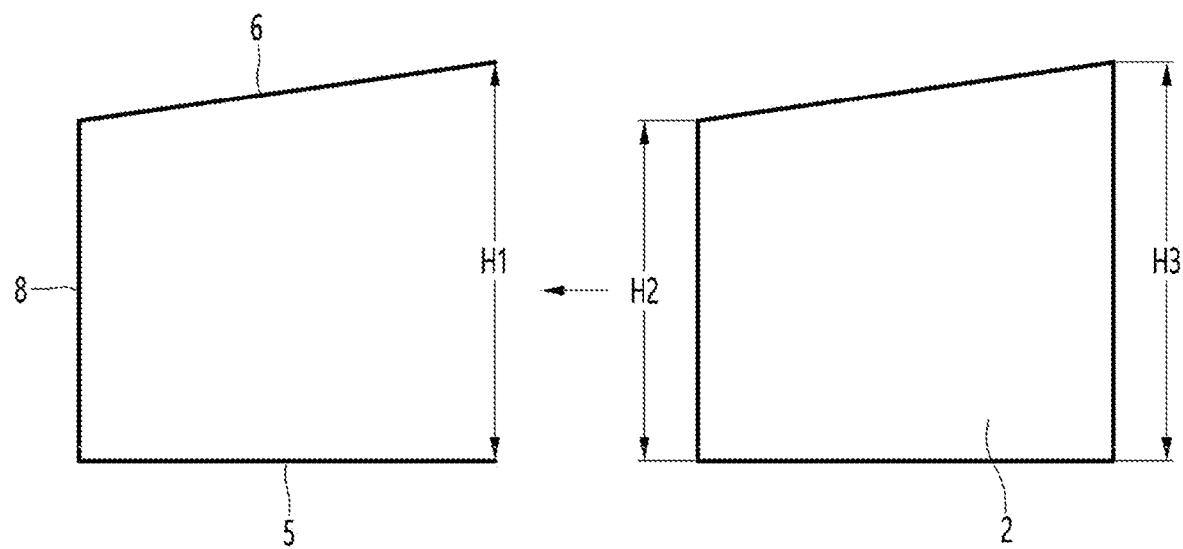
FIG. 10 is a simplified view of height relationships between the second support or second support section and the second air purifier inserted therein.

Referring to FIG. 10, a distance H1 between front ends of the second and third supports 5 and 6 may be greater than a distance between rear ends of the second and third supports 5 and 6. The distance H1 may also be greater than rear and front heights H2 and H3 of the second air purifier 2. The case 101 of the second air purifier 2 may also be inclined slightly such that the front height H3 is greater than the rear height H2. The second air purifier 2 may resemble a wedge. A relationship of the distances H1, H2, and H3 may be expressed by the following Equation 1:

$$H1 > H2, \text{ and } H2 < H3 \qquad \text{[Equation 1]}$$

Even when the third support 6 sags, a relationship of H1>H2+5 cm may be satisfied so that the second air purifier 2 may be inserted onto the rail 305 of the second support 5. In FIG. 10, each line segment may be regarded as connecting inner surfaces of corresponding members. Each line segment may be virtually linearly connected to a portion causing interference at a time of inserting the second air purifier 2.

Figure 11:
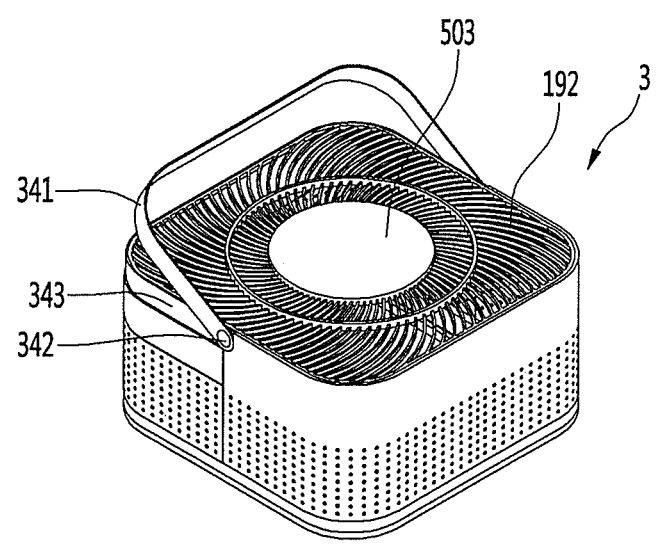
FIG. 11 is a front perspective view of the third air purifier.

Referring to FIG. 11, a discharge grill 192 may be provided at a periphery of the display 502, and the display 502 may be provided at a center of the upper surface of the third air purifier 3. As an example, the display 502 may face upward so that a user looking down at the upper surface of the third air purifier 3 may view the display 502, but embodiments disclosed are not limited hereto. As an alternative example, the display 502 may protrude upward to face a front, and the user may view the display 502 by looking at the front of the air purifying system.

A handle 341 may extend from at least one side of the third air purifier 3. The user may conveniently carry and transport the third air purifier 3 via the handle 341. Since the third air purifier 3 may be smallest is size, weight, and air cleaning capacity, the user may not require any assistive force or any transport devices to move and/or reposition the third air purifier 3.

As an example, the handle 341 may resemble a bucket handle hinged to opposite sides of the third air purifier 3. The handle 341 may be fixed to the case 101 by a hinge 342 to be rotatable. An upper portion of a side of the case 101 of the third air purifier may include a handle groove 343 which is recessed inward. A size and shape of the handle groove 343 may correspond to a size and shape of the handle 341, and when the handle 341 is not in use, the handle 341 may be rotated to a storage position to be inserted and stored in the handle groove 343. When the user desires to use the handle 341, the handle 341 may be rotated via the hinge 342 to a use position. The handle 341 may be stored in the handle groove 343 to prevent an external object from unnecessarily catching on the handle 341 and knocking down the third air purifier 3 and/or the docking station 7.

Referring to FIG. 12, the flow guide 306 of the second support 5 may guide a flow direction of clean air discharged from the first air purifier 1. The flow guide 306 may change a direction of the discharged air flowing in the axial direction to the radial direction. In FIG. 12, arrows show the flow of the discharge air discharged from the first air purifier 1. Referring to the arrows, clean air immediately discharged from the first air purifier 1 may have a relatively large flow rate, and may be directed outward to the side.

The air discharged from the first air purifier 1 may be guided by the flow guide to target a side clean area, which is indicated by a dotted line on the right side of the first air purifier 1. The air directed to the side clean area on the right may become concentrated, and may not be widely spread or dispersed. The air in the side clean area may remain at a particular height, and may not spread too much in the upward and downward directions.

The dotted line on the left side of the first air purifier 1 exemplifies an area to which discharged air may be directed when the flow guide 306 is omitted. Such an area on the left may be referred to as a diffused clean area, as the clean air may not be as concentrated in the diffused clean area as in the side clean area. Dimensions of the first air purifier 1 and/or the flow guide 306 may be configured so that discharged air targets predetermined diffused clean areas and/or side clean areas. For example, the first air purifier 1 may be wider than longer, and air flowing in the axial direction may be relatively strong.

The side clean area may be provided 50 centimeters or less from the floor, which may be a space where infants play. The flow guide 306 may be used when intensive air purification is required for positions adjacent to the first air purifier 1, such as when the air purifier is first brought home, returned to a room that has become dirty, when a cleaning capacity of the first air purifier 1 is insufficient, or when the first air purifier 1 beings operation. The flow guide 316 of the second air purifier 2 may be configured similarly to the flow guide 306 of the first air purifier 1, and the second air purifier 2 may be configured to target similar side clean and diffused clean areas.

Hereinafter, an operation of the air purifying system provided with a plurality of air purifiers which may be stacked on top of each other and used together or which may be separated to be used in different areas according to embodiments will be described. According to the following description, the user may conveniently move each air purifier and may conveniently operate each air purifier even when the second and third air purifiers 2 and 3 are not docked on the docking station 7. In the described example, the first air purifier 1 may be integrated with the docking station 7, but one of ordinary skill in the art should appreciate that the first air purifier 1 may also be separable from the docking station 7 like the second and third air purifiers 2 and 3.

Figure 13:
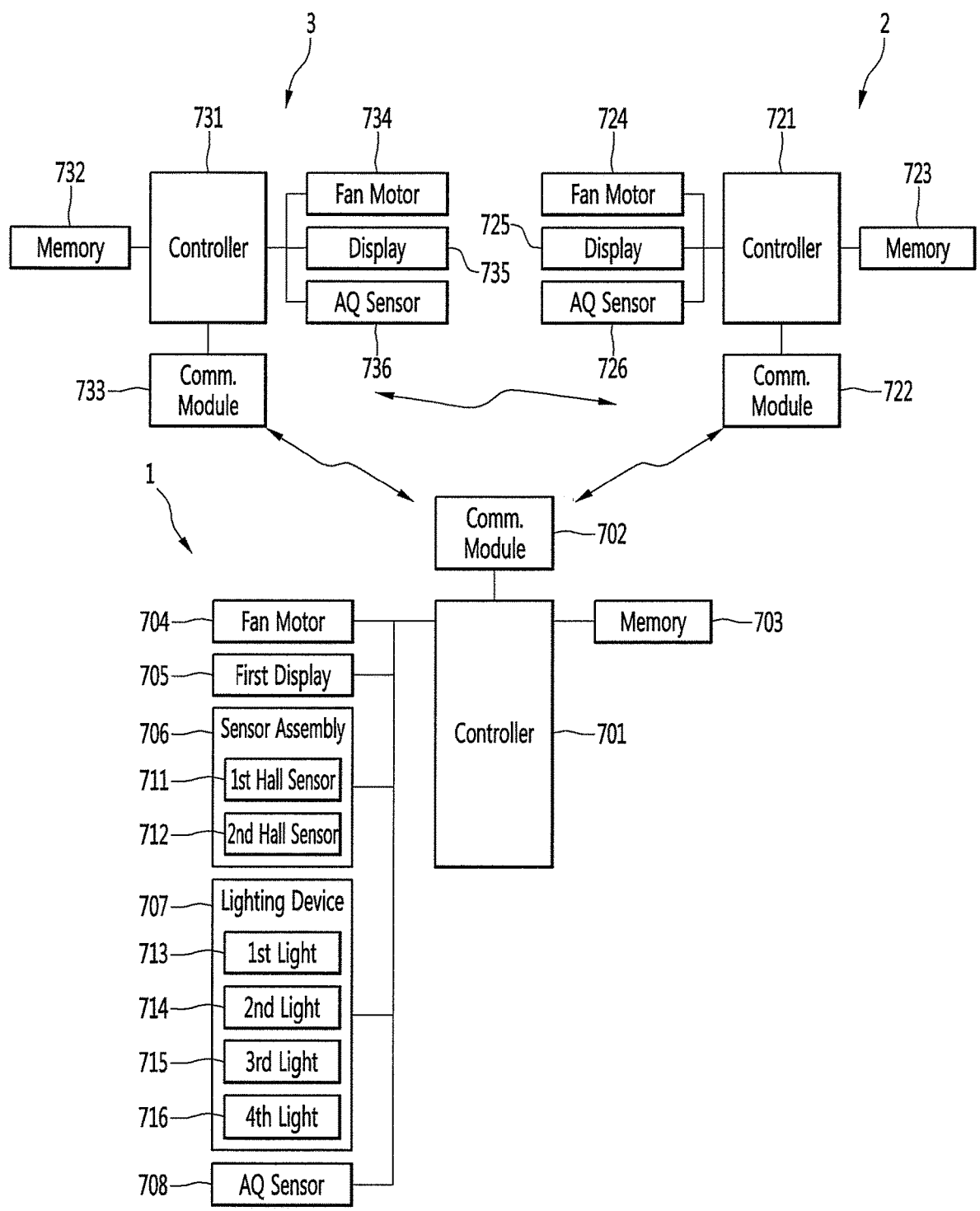
FIG. 13 is a block diagram explaining a configuration of an air purifying system according to an embodiment.

FIG. 13 is a block diagram explaining a configuration of the air purifying system according to an embodiment. The numbers used in FIG. 13 may be assigned different numbers to those used in the above description for convenience of understanding. For example, in the above description, the numbers 80 to 84 are used for light devices, but in FIG. 13, numbers 713 to 716 may denote light devices.

Referring to FIG. 13, the air purifying system may include first, second and third air purifiers 1, 2, and 3. The second and third air purifiers 2 and 3 may be removable from the docking station 7, and the first air purifier 1 may be integrated with the docking station 7.

The first air purifier 1 may include a controller 701 that controls an entire air purifying system. When the first air purifier 1 is removable from the docking station 7, a separate control assembly provided in the docking station 7 may control the air purifying system. The first air purifier 1 and/or the docking station 7 may include a memory 703 that stores information (e.g., status information, operating information, mounting information, location information, time, temperature, or air purifying information), a communication module 702 that performs communication among the first, second, and third air purifiers 1, 2, and 3, and a drive unit or assembly.

The drive assembly may be provided with a fan motor 704 to generate an air purifying or suction function, a first display 705 provided on the docking station, a sensor assembly 706 to sense a seating or mounting and separation of the second and third air purifiers 2 and 3 from the docking station 7, a lighting device 707, and an air quality sensor 708.

The sensor assembly 706 may include a first hall sensor 711 to sense a mounting and separating of the second air purifier 2 and a second hall sensor 712 to sense a mounting and separating of the third air purifier 3. The lighting device 707 may include first, second, third, and fourth lights 713, 714, 715, and 716 provided at various positions of the docking station 7.

The second air purifier 2 may include a controller 721 and a memory 723 and the third air purifier 3 may include a controller 731 and a memory 732. The memories 723 and 732 may store information (e.g., status information, operating information, mounting information, location information, time, temperature, or air purifying information). The memories 723 and 732 may be controlled by the controllers 721 and 731, respectively. The second and third air purifiers 2 and 3 may each have communication modules 722 and 733 ("comm. modules" in FIG. 13). The communication modules 702, 722, and 733 may communicate with each other to exchange information.

The second and third air purifiers 2 and 3 may include fan motors 734 and 724 to suction air, displays 725 and 735 to indicate operation states, display information stored in the memory, and/or and input a user's instruction, and air quality (AQ) sensors 726 and 736 to measure an air quality or air pollution level.

When the second hall sensor 712 indicates that the third air purifier 3 is mounted, the controller 701 of the first air purifier 1 may control the third display 735 (via, for example, the controllers 701 and 731 and the communication modules 702 and 733) to change of a mode displayed on the third display 735. Alternatively, when the second hall sensor 712 is aligned with a magnet provided in the docking station 7 (e.g., in the backbone or on the third support 6), the third display 735 may be controlled directly by the controller 731 of the third air purifier 3 without direction from the controller 701 of the first air purifier 1. Magnets and hall sensors may be provided in any number of positions or configurations to detect a mounting when the hall sensors and magnets approach each.

The modes which may be displayed on the third display 735 may include a full or overall mode indicating a driving state of the entire air purifying system, a magnetic or individual mode indicating a driving state of only the third air purifier 3, a pollution mode to indicate air quality at position where the third air purifier 3 is placed, a selection mode to indicate the state of the an air purifier selected by the user, and a light mode to serve as a light and illuminate a room without displaying information. In the full mode, a pollution state of the environment in which the third air purifier is placed may be displayed, an average pollution state of the environments in which all of the first, second, and third air purifiers 1, 2, and 3 are provided may be displayed, and/or all operation states of the first, second, and third air purifiers 1, 2, and 3 may be shown. In the magnetic mode, an air volume and speed of the third air purifier 3 may be shown. The third display 735 may be in the full mode after a mounting of the third air purifier 3 is indicated by the second hall sensor 712. The third display 735 may be convenient for the user to view when both the second and third air purifiers 2 and 3 are docked on the docking station 7, and may therefore be a display where a user may access information on the entire air purifying system. However, since a size of the third display 735 may be small, information displayed may be small. When the third air purifier 3 is not docked on the docking station 7, the third display 735 may display modes other than the full mode (or, alternatively, at a user's instruction, may display the full mode).

The display 725 of the second air purifier 2 may be hidden or covered by the third support 6 when the second air purifier 2 is mounted. Therefore, it may not be necessary for the second display 725 to be in the full mode, but displaying such a mode is of course possible. For example, if the first hall sensor 601 indicates that the second air purifier 2 has been mounted on the second support 5 of the docking station 7, the mode of the second display 725 may be changed to the full mode.

When the second air purifier 2 is separated from the docking station 7, the second display 725 may display information relating to the second air purifier 2. For example, the second display 725 may be operated in a magnetic mode indicating a driving state of only the second air purifier 2, a pollution mode to indicate air quality at position where the second air purifier 2 is placed, the selection mode to indicate the state of the an air purifier selected by the user, and the light mode to serve as a light and illuminate a room without displaying information.

The first, second, third, and fourth lighting devices 713, 714, 715, and 716 may be operated in various numbers and combinations, and may be controlled automatically by the controller 701 and/or via an input by the user in any one of the second and third displays 725 and/or 735. In addition, the docking station 7 may optionally have a user interface in which the user may enter commands.

FIG. 14 may illustrate a control method of the air purifying system.

Referring to FIG. 14, a portable air purifier (e.g., first air purifier 1, second air purifier 2, third air purifier 3, and/or a separate air purifier) capable of being moved may be seated and/or docked on a docking station 7 (S1).

After being docked, a mode of a display of the portable air purifier may be changed (S2). As an example, the display may be changed to a full mode that displays an overall state of the air purifying system from a magnetic mode that displays only the operating state of the portable air purifier having the display. Which mode to be displayed may be stored in a memory. The mode may be changed to another mode based on a command of the user. Alternatively, a mode changing scheme may be predetermined by the user such that the user may set which modes are to be displayed in which situations. Modification of the modes may be performed automatically.

The modes may change based upon interactions between hall sensors and magnets, but embodiments are not limited to magnetic coupling to indicate that a portable air purifier has been docked. For example, the docking station 7 may include a weight sensor, a touch sensor, etc. to sense whether a portable air purifier has been docked on the docking station 7, and the mode on the display may be changed based on information sensed by the weight sensor, touch sensor, etc.

The user may change the mode by selecting a desired mode (S3). For example, the display may include a user interface (e.g., a touch panel or button), and the mode of the display may be changed based on an input (e.g., a number of times the user touches the user interface). As an example, the user may select a mode among a selection mode that indicates status information of a particular portable air purifier that is part of the air purifying system, a pollution degree mode indicating air pollution information obtained from air quality sensors provided in the portable air purifier and/or the docking station, and a light mode where the display may emit light to illuminate a space. Embodiments disclosed herein are not limited to the above-described mode. For example, the display may be operated in a temperature mode that displays temperature information obtained from a temperature sensor and/or data provided wirelessly or location information of the portable air purifiers in the air purifying system. After the user selects his desired mode in S3, the selected mode desired by the user may be displayed (S4).

When the portable air purifier is separated from the docking station 7 (S5), the mode of the display may also be changed (S6). As an example, the may be changed from the full mode to the magnetic mode after the air purifier has been removed. The switching of this mode may automatically occur to maximize convenience.

The user may also decide in advance which mode should be implemented when the portable air purifier is removed, or decide to manually change the mode displayed after the mode has been automatically changed.

This application is related to co-pending U.S. application Ser. No. 16/818,096 filed on Mar. 13, 2020 and Ser. No. 16/819,368 filed on Mar. 16, 2020, the entire contents of which are hereby incorporated by reference.

Embodiments disclosed herein may include a plurality of air purifiers to be used together or separately. A user may conveniently view a display and operate the air purifying system.

Embodiments disclosed herein may perform various air purifying operations corresponding to an indoor space by using a single air purifying system provided with a plurality of air purifiers. Industrial application may be performed conveniently.

Embodiments disclosed herein may provide an air cleaning or purifying system and an air cleaning or purifying system control method capable of variously operating a plurality of air purifiers in a variety of places in accordance with a residential environment by using a single air cleaning or purifying system.

Embodiments disclosed herein may provide an air cleaning or purifying system and an air cleaning or purifying system control method that may be customized to perform air cleaning on particular spaces by simply moving and/or individually operating individual air purifiers to particular places. A user may not have to manually set different operating settings.

Embodiments disclosed herein may provide an air cleaning or purifying system and a control method of an air cleaning system that may address various air cleaning capacity needs depending on an installation space or room, individual taste, and/or environmental needs.

Embodiments disclosed herein may provide a control method of an air cleaning or purifying system and an air cleaning or purifying system that allows a user to conveniently check and change an operation state of the air cleaning system when a plurality of air cleaners or purifiers are separated and mounted.

Embodiments disclosed herein may provide an air cleaning or purifying system including at least two air cleaners or purifiers capable of independently operating and a docking frame or station to support the at least two air cleaners from below. Clean air may be appropriately supplied to various indoor rooms, spaces, or areas.

The docking frame may include a backbone extending in a vertical direction and at least two of the at least two air purifiers may be supported on the backbone. A display may be provided. A mode displayed on the display may be changed when an air purifier among the at least two air purifiers is mounted or detached. The display may include various user interfaces, each corresponding to a movable air purifier and a position where the docking station is placed so that the user may conveniently use, operate, and control the air purifying system.

At least one of the at least two air purifiers may be fixed to the docking station, and at least one of the at least two air cleaners may be free to separate from the docking station. Individual air cleaning operations may be performed for various spaces or rooms including, e.g., a living or family room, a bedroom, a study, a kitchen, a dining room, etc. There may be at least two detachable air purifiers that are freely detachable from the docking frame so that an air cleaning or purifying operation may be customized to an indoor space of various rooms having various sizes.

A first sensing unit or sensor may be provided on an air purifier having the display. A second sensing unit or sensor may be provided at a position corresponding to the first sensor when the detachable air purifier is seated in the docking frame. The second sensor may automatically detect whether the detachable air cleaner is mounted to or detached from the docking station, and a display mode shown on the display may be automatically changed during detachment and mounting so that a user may conveniently use and control the air purifying system. The first sensor may be one of a hall sensor or a magnet, and the second sensor may be the other one of a hall sensor or a magnet. It may be possible to accurately detect mounting or detachment by a simple signal or electromagnetic sensing operation. The display may automatically change the display mode so that the user may conveniently use the air purifier without having to recognize or operate it.

The modes implemented by the display may include a full or overall mode indicating a driving state of the entire air purifying system and a magnetic or individual mode indicating a driving state of only the air purifier on which the display is provided. The detachable air purifier may display its own driving state when separated from the docking station, and may display a status of all the air purifiers and/or devices included in the air purifying system when mounted on the docking station. Such a display operation may be convenient for the user.

A pollution degree display mode may indicate air quality at a position where the air purifying system is located. A selection mode may display a status of an air purifier selected by the user. An illumination mode may emit light without displaying status or operation information. There may be other modes to control an operation, such as to increase a rotation of the fan, etc.

At least two supports may be provided with at least two lights that are separated and independently controllable from each other so that the user may control illumination to be in a desired state or setting. Independent controllable illumination may be provided via a light provided on a back side of the backbone to enhance user satisfaction and provide indirect or dim illumination.

At least one of the at least two air purifiers may be lifted and removed from the at least two supports, the docking station, or from an air purifier provided below the lifted air purifier. Accordingly, the user may more conveniently handle the air purifier.

At least support of the at least two supports may be provided with a flow guide provided on a bottom and having a convex curvature upward so that a direction of air discharged from below the flow guide by be guided to a side. The air purifying system may be more efficient by controlling a flow path of air discharged from an air purifier vertically aligned and/or stacked with the flow guide on the docking station.

At least one of the at least two supports may be brought into contact with an upper surface of at least one of the at least two air purifiers provided below the support. Even if the support becomes weak due aging, the air purifying system may still operate.

The at least two supports may include or form inlet portions, and a space between the supports that forms the inlet portion may be larger than a height of a rear of one of the at least two air purifiers. Such an air purifier may be an air purifier that is predetermined to be inserted into the inlet portion. The air purifier may be conveniently handled by the user without difficulty in a mounting operation, as stacked air purifiers may be mounted and/or inserted at intervals.

One of the at least two air purifiers may be configured to be inserted into an inlet portion formed in the docking station. The inlet portion may be formed between two supports. A rear of the air purifier may be smaller than a space between a top and bottom of the inlet portion. The user may conveniently use the air purifying system for a long time.

Embodiments disclosed herein may be implemented as an air cleaning or purifying system including a first air cleaner including a fan and a filter to perform air cleaning, a second air cleaner including a fan and a filter to perform air cleaning, and a display provided on the first air cleaner. The display may have an overall or full-system mode to display an overall operating state of the first air cleaner and the second air cleaner and a self-mode to indicate an operation state of only the first air cleaner. Any one of the air cleaners may display its own magnetic or mounting state or display the states of the other air cleaners together. Thus, an air cleaning system capable of separating and assembling or stacking air cleaners may be more conveniently used.

During a pollution degree display mode, the display may indicate air quality at a position where the air cleaning system is placed, and different air qualities may be selectively displayed based on various positions of the air cleaners when the air cleaners are separated. The pollution degree display mode may be conveniently applied to a specific user who wants a simple display.

During a selection mode, the display may indicate the state of the air cleaner selected by the user. The selection mode may be conveniently applied in the case of a user who wants specific information. During a display or illumination mode, the display may perform a function of illumination without displaying information. The illumination mode may be more conveniently applied to a simple status display and at night. The second air cleaner may be provided with another or a second display, the user may selectively use a plurality of displays.

The first air cleaner and the second air cleaner may be mounted and separated freely in a single mating frame or docking station. In this case, the air cleaner may collect more dust or perform a more intense cleaning operation.

Embodiments disclosed herein may be implemented as a control method for an air cleaning system comprising at least two air cleaners which are independently operable and are spaced apart from each other. At least one of the at least two air cleaners may be provided with a display. When the air cleaner is seated on a stand, a display mode shown by the display may be automatically changed. The user may conveniently observe and operate the air cleaning system using a plurality of displays. The user may select and change the display mode shown by the display so that the user may obtain a state of a plurality of air cleaners and obtain information thereof in a desired state.

The display mode may be automatically changed when the air purifier provided with the display is disconnected from the docking station. The display mode may be automatically changed so that the air cleaner may be operated more conveniently. An operation state of each air cleaner or of the entire air cleai=ning system may be detected.

Possible display modes may include a full or overall system mode for displaying an entire operation state of all of the at least two air cleaners. A pollution degree display mode may display an operating state of only the air cleaner provided with the display and/or air quality information of the entire air cleaning system or at a location where an individual air cleaner is placed. A selection mode may display a status of a particular air cleaner selected by the user. An illumination mode may alter light emitted from the display so that the display may function as a light without displaying information. The user may select a mode from the possible display modes via at least one user interface provided in the display. A display mode of each air cleaner may be changed via one user interface to increase convenience.

Embodiments disclosed herein may be implemented as at least two or more air purifiers or cleaners suitable for a plurality of separate or partitioned indoor spaces. The at least two air purifiers may be integrated into a single air cleaning or purifying system. Clean air may be appropriately supplied to the plurality of indoor spaces at the same time.

Individual air cleaners may be easy to move and remain in a state of being charged with energy. Thus, the user may carry out an optimal air cleaning operation by carrying only an air cleaner having a desired capacity and moving the air cleaner to a desired place for operation.

A more diversified air cleaning operation may be implemented by using a plurality of individual air purifiers together or separate to address specific purposes or needs. The air cleaning system may be used in response to more diverse needs of consumers.

An operating state of each air cleaner may be displayed when the air cleaners are separated, and may be displayed in various modes necessary for the air cleaner system in the assembled state so that the user may conveniently use the air cleaner system. A mounting state may be determined via magnets and hall sensors provided in the air cleaners and stand, and the mounting state may be displayed on the display.

Embodiments disclosed herein may be implemented as an air purifying system comprising a first air purifier having a first case, a first fan provided inside the first case to suction and discharge air, and a first filter provided inside the first case to filter suctioned air, a second air purifier having a second case, a second fan provided inside the second case to suction and discharge air, and a second filter provided inside the second case to filter suctioned air, and a docking station having a backbone extending in a vertical direction and having first and second supports extending horizontally from the backbone and spaced apart from each other by a prescribed distance. The first and second air purifiers may be configured to operate independently. The first air purifier may be supported on the first support. When the second air purifier is positioned onto the second support, an operation of the first and second air purifiers may be dependent on each other.

The second air purifier may include a display configured to display information such that, when the second air purifier is positioned onto the second support, the display may display a first predetermined mode, and when the second air purifier is separated from the second support, the display may display a second predetermined mode.

A first sensing device may be provided on the second air purifier. A second sensing device may be provided in the docking station at a position such that, when the second air purifier is positioned on to the second support, the first and second sensing devices are aligned.

The first predetermined mode may be an overall mode that displays a driving state of the entire air purifying system. The second predetermined mode may be an individual mode that displays a driving state of the second air purifier.

The display may be configured to display a selected mode input by a user. The first predetermined mode, the second predetermined mode, and the selected mode may each be any one of the following modes: an overall mode that displays a driving state of the entire air purifying system, an individual mode that displays a driving state of the second air purifier, a pollution degree mode that displays an air quality at a position where the docking station is located, a selection mode that displays a status of an air purifier selected by the user among the first and second air purifiers, and an illumination mode that emits light.

A third air purifier may be provided. The third air purifier may have a third case, a third fan provided inside the third case to suction and discharge air, and a third filter provided inside the third case to filter suctioned air. The docking station may include a third support extending horizontally from the backbone and spaced apart from the second support. When the third air purifier is positioned onto the third support and the second air purifier is positioned onto the second support, the first, second, and third air purifiers may be vertically aligned.

When the second air purifier is positioned onto the second support, a bottom of the third support may contact a top of the second air purifier. The third support may be spaced apart from the second support by a predetermined vertical distance that is larger than a height of the second air purifier. The first air purifier may be permanently attached to the docking station.

Embodiments disclosed herein may be implemented as an air purifying system comprising a first air purifier including a first fan configured to suction air and a first filter configured to filter suctioned air, a second air purifier including a second fan configured to suction air and a second filter configured to filter suctioned air, and a display provided on the first air purifier. The display may be configured to operate according to a plurality of modes. The plurality of modes may include an overall mode to indicate an overall operating state of the first and second air purifiers and an individual mode to indicate an operating state of the first air purifier.

An air quality sensor may be provided to sense air quality. The plurality of modes may include a pollution degree mode to indicate air quality based on the sensed air quality.

The plurality of modes may include a selection mode indicating an operating state of one air purifier among the first and second air purifiers selected by a user. The plurality of modes may include an illumination mode to illuminate an area in which the display is provided. The second air purifier may be provided with a second display configured to operate according to the plurality of modes.

A docking station may be provided. The docking station may be configured to support the first and second air purifiers. Each of the first air purifier and the second air purifier may be configured to be coupled to and decoupled from the docking station.

Embodiments disclosed herein may be implemented as an air purifying system comprising a first air purifier including a first fan configured to suction air and a first filter configured to filter suctioned air, a second air purifier including a second fan configured to suction air and a second filter configured to filter suctioned air, a docking frame, and a display. The first and second air purifiers may be spaced apart from each other in a first direction when the first and second air purifiers are docked to the docking frame. The display may be provided on the first on air purifier. The display may be configured to operate according to a mode among a plurality of modes. When the first air purifier is docked to the docking frame, the mode of the display may be automatically changed.

A user interface may be provided. The mode of the display may be changed when a user inputs a command to change the mode.

When the first air purifier is separated from the docking frame, the mode of the display may be automatically changed.

The plurality of modes may include an overall mode to display information about an overall operating state of the first and second air purifiers, an individual mode to display information about only an operating state of the first air purifier, a pollution degree mode to display information about air quality, a selection mode to display information about an operating state of an air purifier selected by the user, and an illumination mode to emit light without displaying information.

When the first air purifier is docked to the docking frame, the mode of the display may be automatically changed to a first predetermined mode. When the first air purifier is separated from the docking frame, the mode of the display may be automatically changed to a second predetermined mode. The first predetermined mode may be the overall mode or a first mode among the plurality of modes preset by the user. The second predetermined mode may be the individual mode or a second mode among the plurality of modes preset by the user.

It will be apparent to those skilled in the art that various modifications and variations can be made in the present disclosure without departing from the spirit or scope of the invention. It can be said that embodiments disclosed herein may also be included within the scope of the present disclosure.

Embodiments disclosed herein may be implemented as an air purifying system capable of being operated in cooperation with at least two air purifiers which may be individually operated in a single space. In the air purifying system, at least two air purifiers capable of individual operation may be integrated together by other elements or components. The air purifying system may be separated from the other elements by at least one air purifier capable of individual operation. At least two air purifiers capable of individually operating may be separated from each other so that separate operation may be performed in different environments.

Although the description provides three air purifiers, one of ordinary skill in the art should appreciate that less than three, or alternatively, three or more air purifiers may be used similarly. For example, four air purifiers may be capable of being docked onto a docking station and/or removed to operate individually. The air purifiers may be docked on corresponding supports provided in the docking station. Each support may have an upper and lower frame. The upper and lower frames may be connected to each via a lattice-shaped skeleton and may have different thicknesses. The front side of the air purifying system may be a side which the user mainly approaches.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifying system, comprising:
a first air purifier having a first case, a first fan provided inside the first case to suction and discharge air, and a first filter provided inside the first case to filter suctioned air;
a second air purifier having a second case, a second fan provided inside the second case to suction and discharge air, and a second filter provided inside the second case to filter suctioned air, wherein the first and second air purifiers are configured to operate independently; and
a docking station having a backbone extending in a vertical direction and having first and second supports extending horizontally from the backbone and spaced apart from each other by a prescribed distance, the first air purifier being supported on the first support, wherein, when the second air purifier is positioned onto the second support, an operation of the first and second air purifiers are dependent on each other.

2. The air purifying system of claim 1, wherein the second air purifier includes a display configured to display information such that, when the second air purifier is positioned onto the second support, the display displays a first predetermined mode, and when the second air purifier is separated from the second support, the display displays a second predetermined mode.

3. The air purifying system of claim 2, further comprising:
a first sensing device provided on the second air purifier; and
a second sensing device provided in the docking station at a position such that, when the second air purifier is positioned on to the second support, the first and second sensing devices are aligned.

4. The air purifying system of claim 2, wherein the first predetermined mode is an overall mode that displays a driving state of the entire air purifying system, and the second predetermined mode is an individual mode that displays a driving state of the second air purifier.

5. The air purifying system of claim 2, wherein
the display is configured to display a selected mode input by a user, and
the first predetermined mode, the second predetermined mode, and the selected mode may each be any one of the following modes:
an overall mode that displays a driving state of the entire air purifying system;
an individual mode that displays a driving state of the second air purifier;
a pollution degree mode that displays an air quality at a position where the docking station is located;
a selection mode that displays a status of an air purifier selected by the user among the first and second air purifiers; and
an illumination mode that emits light.

6. The air purifying system of claim 1, further comprising a third air purifier having a third case, a third fan provided inside the third case to suction and discharge air, and a third filter provided in the third case to filter suctioned air,
wherein the docking station includes a third support extending horizontally from the backbone and spaced apart from the second support, and when the third air purifier is positioned onto the third support and the second air purifier is positioned onto the second support, the first, second, and third air purifiers are vertically aligned.

7. The air purifying system of claim 6, wherein, when the second air purifier is positioned onto the second support, a bottom of the third support contacts a top of the second air purifier.

8. The air purifying system of claim 6, wherein the third support is spaced apart from the second support by a predetermined vertical distance that is larger than a height of the second air purifier.

9. The air purifying system of claim 8, wherein the first air purifier is permanently attached to the docking station.

10. An air purifying system, comprising:
a first air purifier including a first fan configured to suction air and a first filter configured to filter suctioned air;
a second air purifier including a second fan configured to suction air and a second filter configured to filter suctioned air;
a first display provided on the first air purifier, wherein the first display is configured to operate according to a plurality of modes, the plurality of modes including an overall mode to indicate an overall operating state of the first and second air purifiers and an individual mode to indicate an operating state of the first air purifier; and
a second display provided on the second air purifier and configured to operate according to the plurality of modes.

11. The air purifying system of claim 10, further comprising an air quality sensor to sense air quality, wherein the plurality of modes includes a pollution degree mode to indicate air quality based on the sensed air quality.

12. The air purifying system of claim 10, wherein the plurality of modes includes a selection mode indicating an operating state of one air purifier among the first and second air purifiers selected by a user.

13. The air purifying system of claim 10, wherein the plurality of modes includes an illumination mode for the display to emit a light as an illumination toward an area in which the display is provided, without displaying information.

14. The air purifying system of claim 10, further comprising a docking station configured to support the first and second air purifiers, wherein each of the first air purifier and the second air purifier is configured to be coupled to and decoupled from the docking station.

15. An air purifying system, comprising:
  a first air purifier including a first fan configured to suction air and a first filter configured to filter suctioned air;
  a second air purifier including a second fan configured to suction air and a second filter configured to filter suctioned air;
  a docking frame, the first and second air purifiers being spaced apart from each other in a first direction when the first and second air purifiers are docked to the docking frame; and
  a display provided on the first air purifier, the display being configured to operate according to a mode among a plurality of modes, wherein, when the first air purifier is docked to the docking frame, the mode of the display is automatically changed.

16. The air purifying system of claim 15, further comprising a user interface, wherein the mode of the display is changed when a user inputs a command to change the mode.

17. The air purifying system of claim 15, wherein, when the first air purifier is separated from the docking frame, the mode of the display is automatically changed.

18. The air purifying system of claim 15, wherein the plurality of modes includes:
  an overall mode to display information about an overall operating state of the first and second air purifiers;
  an individual mode to display information about only an operating state of the first air purifier;
  a pollution degree mode to display information about air quality;
  a selection mode to display information about an operating state of an air purifier selected by the user; and
  an illumination mode to emit light without displaying information.

19. The air purifying system of claim 18, wherein, when the first air purifier is docked to the docking frame, the mode of the display is automatically changed to a first predetermined mode, when the first air purifier is separated from the docking frame, the mode of the display is automatically changed to a second predetermined mode, the first predetermined mode being the overall mode or a first mode among the plurality of modes preset by the user and the second predetermined mode being the individual mode or a second mode among the plurality of modes preset by the user.

20. An air purifying system, comprising:
  a first air purifier including a first fan configured to suction air and a first filter configured to filter suctioned air;
  a second air purifier including a second fan configured to suction air and a second filter configured to filter suctioned air;
  a display provided on the first air purifier, wherein the display is configured to operate according to a plurality of modes, the plurality of modes including an overall mode to indicate an overall operating state of the first and second air purifiers and an individual mode to indicate an operating state of the first air purifier; and
  a docking station configured to support the first and second air purifiers,
  wherein each of the first air purifier and the second air purifier is configured to be coupled to and decoupled from the docking station.

\* \* \* \* \*